US012703003B2

(12) United States Patent
Nabki et al.

(10) Patent No.: US 12,703,003 B2
(45) Date of Patent: Aug. 11, 2026

(54) PULSE SHAPING METHODS FOR NON-LINEAR ACOUSTIC PIEZOELECTRIC TRANSDUCERS

(71) Applicant: ÉCOLE DE TECHNOLOGIE SUPÉRIEURE, Montreal (CA)

(72) Inventors: Frederic Nabki, Montreal (CA); Mathieu Gratuze, Montreal (CA)

(73) Assignee: ÉCOLE DE TECHNOLOGIE SUPÉRIEURE, Montreal (CA)

( * ) Notice: Subject to any disclaimer, the term of this patent is extended or adjusted under 35 U.S.C. 154(b) by 170 days.

(21) Appl. No.: 18/699,392

(22) PCT Filed: Oct. 14, 2022

(86) PCT No.: PCT/CA2022/051511
§ 371 (c)(1),
(2) Date: Apr. 8, 2024

(87) PCT Pub. No.: WO2023/060354
PCT Pub. Date: Apr. 20, 2023

(65) Prior Publication Data

US 2024/0416384 A1 Dec. 19, 2024

Related U.S. Application Data

(60) Provisional application No. 63/262,535, filed on Oct. 14, 2021.

(51) Int. Cl.
*B06B 1/02* (2006.01)
*B06B 1/06* (2006.01)

(52) U.S. Cl.
CPC .......... *B06B 1/0215* (2013.01); *B06B 1/0644* (2013.01); *B06B 2201/55* (2013.01)

(58) Field of Classification Search
CPC .. B06B 1/0215; B06B 1/0644; B06B 2201/55
See application file for complete search history.

(56) References Cited

U.S. PATENT DOCUMENTS 3,805,189 A * 4/1974 Zucker .................. H03B 5/326 331/107 A
8,611,190 B1 * 12/2013 Hughes .................... H04R 3/00 381/75
9,077,060 B2 * 7/2015 Nguyen ............... H01H 50/005
(Continued)

*Primary Examiner* — Abdallah Abulaban
(74) *Attorney, Agent, or Firm* — Rosenberg, Klein & Lee

(57) ABSTRACT

Piezoelectric Micromachined Ultrasonic Transducers (PMUTs) exploiting microelectromechanical systems (MEMS) support monolithic integration with silicon based CMOS electronic thereby leveraging the cost benefits of large wafer automated silicon processing. However, nonlinear behaviour in MEMS resonators compromises their performance in some applications whilst being desired in other applications. Accordingly, the inventors have established techniques for the characterisation of the nonlinear behaviour allowing designers to tailor the design and manufacturing of the MEMS resonators to particular applications. Further, there are provided drive schemes for these MEMS resonators for improved performance with respect to the generation of pulses from such MEMS resonators.

13 Claims, 17 Drawing Sheets

(56) References Cited

U.S. PATENT DOCUMENTS

| | | | | |
|---|---|---|---|---|
| 2012/0206594 | A1* | 8/2012 | Datskos | G01N 29/2418 73/579 |
| 2016/0290855 | A1* | 10/2016 | Rhoads | G01L 9/00 |
| 2018/0316353 | A1 | 11/2018 | Hafiz et al. | |

* cited by examiner

700A

700B

2000A

2000B

2000C

2000D

2000E

PULSE SHAPING METHODS FOR NON-LINEAR ACOUSTIC PIEZOELECTRIC TRANSDUCERS

CROSS-REFERENCE TO RELATED APPLICATIONS

This patent application claims the benefit of priority as a 371 National Phase Entry application of PCT/CA2022/051511 filed Oct. 14, 2022; which itself claims the benefit of priority to U.S. Provisional Patent Application 63/262,535 filed Oct. 14, 2021.

FIELD OF THE INVENTION

This invention relates to microelectromechanical system (MEMS) transducers and more particularly to nonlinear MEMS transducers and methods of pulse shaping signals generated by nonlinear MEMS transducers.

BACKGROUND OF THE INVENTION

Piezoelectric Micromachined Ultrasonic Transducers (PMUTs) exploiting microelectromechanical systems (MEMS) are a major innovation in ultrasonic technology allowing monolithic integration of discrete PMUT devices and arrays of PMUTs with silicon based CMOS electronic etc. as well as leveraging the cost benefits of large wafer automated silicon processing.

However, the presence of nonlinear behaviour in MEMS resonators can compromise their performance for some applications whilst in other applications this nonlinear behaviour is desired.

Accordingly, it would be beneficial to provide techniques for the characterisation of the nonlinear behaviour allowing designers to tailor the design and manufacturing of the MEMS resonators to particular applications.

It would also be beneficial to provide designers with techniques to implement drive schemes for these MEMS resonators to establish improved performance with respect to the generation of pulses from such MEMS resonators.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to microelectromechanical system (MEMS) transducers and more particularly to non-linear MEMS transducers and methods of pulse shaping signals generated by nonlinear MEMS transducers.

In accordance with an embodiment of the invention there is provided a method of driving a non-linear acoustic resonator comprising:

providing a control circuit for controlling the non-linear resonator wherein the control circuit generates an excitation signal in dependence upon a target output from the non-linear resonator and established characteristics of the non-linear resonator; and applying the excitation signal to the non-linear resonator.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
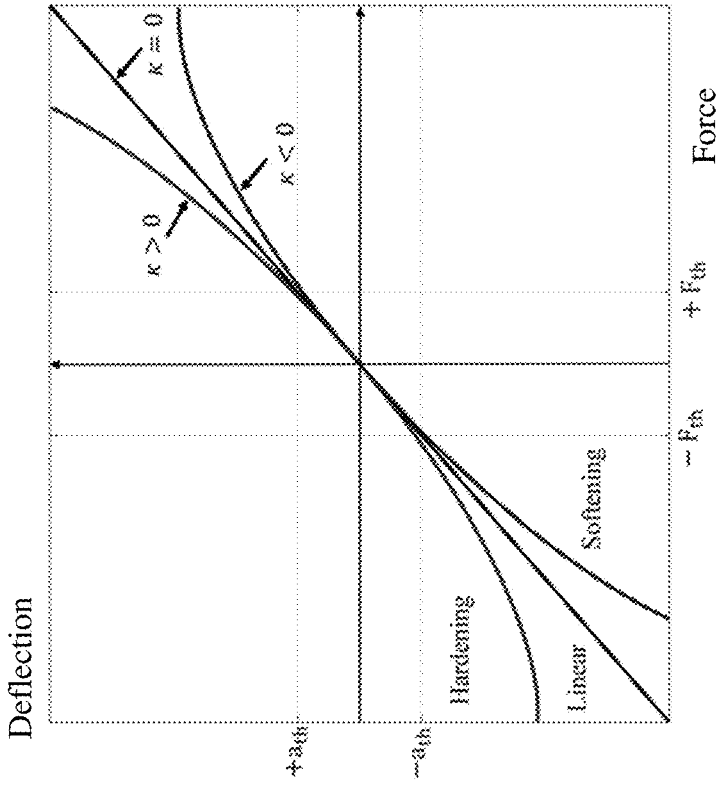
FIG. 1 depicts general load-deflection characteristics of linear and nonlinear vibratory systems.

The present invention is directed to microelectromechanical system (MEMS) transducers and more particularly to nonlinear MEMS transducers and methods of pulse shaping signals generated by nonlinear MEMS transducers.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

Whilst the embodiments of the invention have been described and depicted with respect to square daisy (SD) type nonlinear MEMS resonators the methodologies and processes described with respect to embodiments of the invention can be applied to other nonlinear MEMS resonators without departing from the scope of the invention. It would be further evident to one of skill in the art that the methodologies and processes described with respect to embodiments of the invention can be applied to other nonlinear resonators without departing from the scope of the invention.

The following description is split into two sections. The first section outlines the characterisation of nonlinearities within MEMS resonators and the responses of nonlinear MEMS resonators to adaptations of the excitation signal. The second section extends this to establish methods of exciting nonlinear MEMS resonators to established enhanced performance and more particularly enhanced performance as pulsed generators of acoustic and ultrasonic signals.

Section A: Characterisation and Control of Nonlinearity within MEMS Resonators

The nonlinearities of microelectromechanical systems (MEMS) resonators have been recognized within the prior art as a limitation to their normal operation and accordingly the presence of nonlinear behavior in MEMS resonators can lead to compromised performance. Within the prior art techniques and resonator architectures have been proposed to reduce or compensate for the influence of nonlinearity. On the other hand, nonlinear behavior is usually desired in vibration insulators and vibration energy harvesters (VEHs) as they can leverage a larger displacement and a broader bandwidth. Further, nonlinear resonators are the subject of design and development activity for other devices such as nonlinear MEMS accelerometers, resonators switches and logic gates for example.

However, to appropriately exploit or exert nonlinear phenomena in MEMS devices, specific design guidelines are required. The expression of the nonlinear phenomena can be essentially grouped into two categories, one arising from spring softening and the other from spring hardening. In spring softening, increasing of the amplitude of the excitation leads to a reduction of the resonant frequency, while in spring hardening an increase of the amplitude of the excitation will lead to an augmentation of the resonant frequency. In terms of practical application of the nonlinear phenomenon in MEMS devices, there does not appear at this point to be a preference for either type of nonlinearity within specific applications, as softening and hardening type VEHs, resonators and switches have been presented in the prior art.

However, with ongoing development then it is anticipated that preferences for targeted applications will appear. This highlights the necessity of developing design guidelines and structures which allow the designers to choose either spring softening or spring hardening of the MEMS devices.

Further, the characterization of nonlinear MEMS performance is important to verify the accuracy of the simulations and determine the actual properties of the MEMS devices. However, such nonlinear MEMS devices typically exhibit strong hysteresis phenomena. Such hysteresis renders the characterization more complex, as it causes the performance of the MEMS devices to depend on their previous state. Accordingly, developing characterization methods that allow the mitigation or at least a relative control of such hysteresis is desirable.

Within the prior art several MEMS resonator architectures that exploit the nonlinear behavior in MEMS resonators have been proposed. However, few of these studies investigate both the softening and hardening responses of the same design. Accordingly, the inventors began by studying the impact of different anchoring schemes on the frequency response of piezoelectric MEMS nonlinear resonators, and developing a characterization method which allows for improved control of the hysteresis within these devices. Hence, by using two minor topological variants, the presence of hardening and softening behavior in the same nonlinear MEMS resonator is presented below. The inventors from this identified that it is important to control the characterization of nonlinear MEMS resonators in dependence upon the end application. The inventors establishing this methodology as the characterization methodology employed significantly impacts the performance of the MEMS devices in terms of efficiency and operational frequency range. Accordingly, from the initial work described below the inventors have established the following novel developments:

(i) A MEMS resonator architecture allowing the designer to readily control the type of nonlinearity, i.e. yielding spring hardening or softening;

(ii) A testing methodology allowing the monitoring and control of the hysteresis in the nonlinear resonators; and (iii) Recommendations for the characterization of nonlinear resonators.

Subsequently, in the second section of this specification the inventors based upon these characterisation and design methodologies establish control signals which enhance the pulsed performance of the nonlinear MEMS resonators and exploit the characterised parameters of the MEMS resonators using the methodologies and protocols within this section.

Section A1. Materials and Methods

A1A. Mechanical Nonlinearity in MEMS Resonators

The dynamic response of the conventional cantilever-based MEMS resonator can be analytically expressed by using beam theories as known in the prior art. In applying these theories, it is normally assumed that the vibrating system has a relatively confined deflection and operates linearly. However, the Duffing equation, see "Forced Oscillations with Variable Natural Frequency and their Technical Relevance" (Heft 41/42, Vieweg Braunschweig, 1918), considers the nonlinear parameters alongside the linear parameters, can be applied to nonlinear resonant systems. In this regard, by using the spring-mass system model with the assumptions of a single-degree-of-freedom (SDOF) and the existence of nonlinearity, the equation of motion for a nonlinear mechanical device, while it is excited harmonically with an amplitude of F at a frequency of co for a duration of t seconds, can be written as Equation (1) where x is the deflection, m is the effective mass, ξ is the damping ratio, $k_0$, $k_1$, and $k_2$ represent the linear, square and cubic stiffness coefficients, respectively.

$$m\ddot{x} + \zeta\dot{x} + k_0 x + k_0 x^2 + k_2 x^3 = F \cdot \cos(\omega t) \quad (1)$$

$$f_0 = (1/2\pi)\sqrt{(k_0/m)} \quad (2)$$

$$Q = 2\pi f_0 m / \xi \quad (3)$$

Also, in such a vibrating system the resonant frequency is given by Equation (2) and the quality factor can be estimated from Equation (3). Accordingly, the nonlinearity source in such a vibrating system is due to the nonlinear stiffness coefficients (i.e. $k_1$, and $k_2$), and the analytical solution of Equation (1) implies that the resonant frequency F is dependent on the resonant frequency of the system $f_0$, and the resonant amplitude A by the existence of the nonlinear stiffness coefficients. As a result, variations of the resonant frequency due to the resonant amplitude changes can be given by Equation (4) where A is the amplitude of the displacement of the resonator and κ is known as the amplitude-frequency coefficient, whose value is a function of both linear and nonlinear stiffness coefficients, and can be computed by Equation (5).

$$F \cong f_0 + \kappa A^2 \quad (4)$$

$$\kappa = \left(\frac{3k_2}{8k_0} - \frac{5k_1^2}{12k_0^2}\right) f_0 \quad (5)$$

Consequently, according to the relative values of the stiffness coefficients, MEMS resonator exhibit either a hardening or softening response. In FIG. 1, a general load-deflection characteristic of linear and nonlinear mechanical vibrating systems is illustrated. With reference to this figure, it can be seen that hardening κ>0 and softening responses κ<0, respectively increase or decrease the overall stiffness of the system. In addition, in order to operate the system in the nonlinear regime, the applied force or deflection has to exceed a certain threshold, namely, $F_{TH}$ and $a_{TH}$. Accordingly, when the force is relatively small $F<F_{TH}$ the device operates linearly, such that the hardening or softening response cannot be observed.

Figure 2:
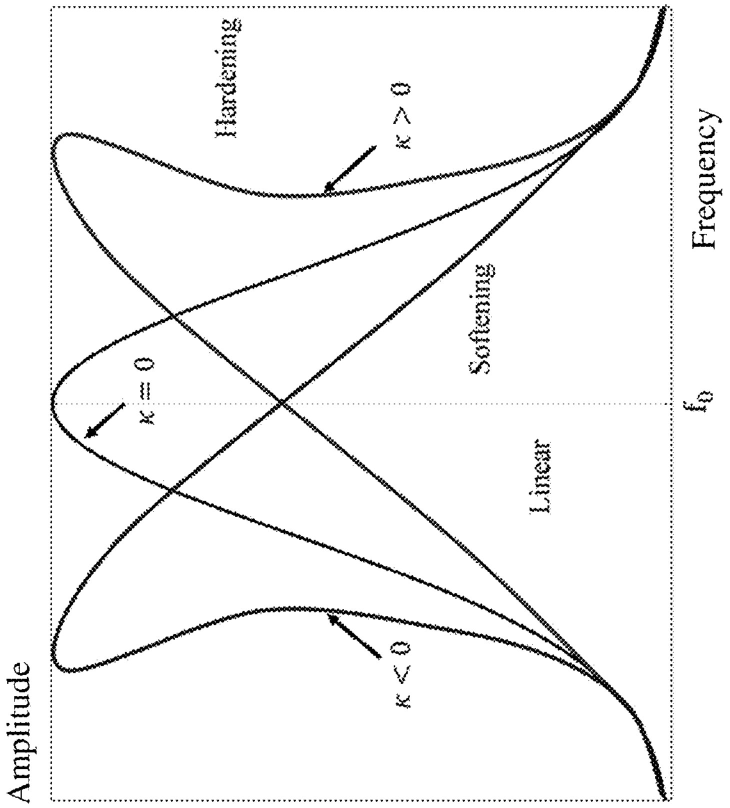
FIG. 2 depicts general frequency responses of linear and nonlinear vibratory systems.

In a general resonating system, the resonant frequency is dependent on the stiffness that is a function of mechanical and geometrical properties. In nonlinear systems, the mechanical stiffness itself is also a function of the resonant amplitude. Therefore, the amplitude-frequency relationship in the frequency spectra of nonlinear resonators comprises discontinuities and exhibits a hysteresis phenomenon. A general frequency response of linear and nonlinear vibratory systems is shown in FIG. 2. For a positive, which results in the hardening response, the resonant frequency shifts to a higher value. In contrast, the negative causes softening and reduces the resonant frequency.

A1B. Control of the Nonlinearity in MEMS Structures

During the design phase, the MEMS designer can exploit three main types of effects to induce nonlinearity in the MEMS device such as damping, forcing, and stiffness for example. Some damping effects have been shown to be inherently nonlinear such as the squeeze film damping. In the case of the forcing effect, it can be exploited to induce nonlinearity by using an external force (i.e. capillary attraction, Van der Waals forces, electrostatic actuation, magnetic forces, etc.). Some of these effects have been successfully demonstrated in MEMS devices. Finally, changes in the stiffness of the MEMS structure will lead to nonlinearity, these changes of stiffness can be attained by using certain materials, in particular piezoelectric ones. These changes in stiffness can also be induced by the use of geometrical nonlinearity as MEMS devices generally undergo relatively large deformation. This geometrical nonlinearity can be caused by a wide range of factors such as large deflections or rotations, initial stresses or load stiffening. These effects are particularly noticeable in the stretching of thin structures.

Figure 3:
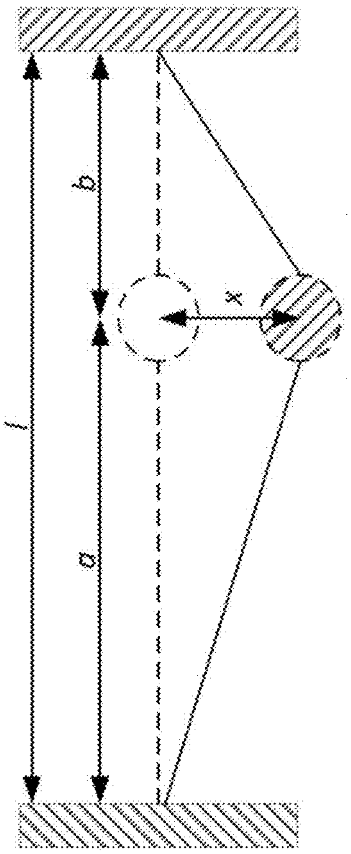
FIG. 3 depicts a weighted string mechanical system.

For the MEMS designer, the use of such previously characterized geometric nonlinearity will allow the control of the nonlinear behavior of the MEMS device. Among these structures some naturally exhibit either a softening or a hardening response. The weighted string is such a system where depending on its initial parameters, it is capable of exhibiting either spring softening or spring hardening or even a linear response. This system is comprised of string of a half-length $l_0$ with a weight of a mass m located at the distance a from one anchor and b from the other anchor where x denotes the displacement of the mass as depicted in FIG. 3. To analytically describe this behavior, an approximation of the governing nonlinear differential equation given by Equation (6) where $F_0$ is the initial tension, S is the cross-sectional area of the string and E is the elastic modulus of the string. In this system for the specific case where a=b, by using Equations (5) and (6), the value of can be expressed by Equation (7). In such a case, the initial tension is given by Equation (8). Therefore, by substituting Equation (8) in Equation (7), Equation (7) can be rewritten as Equation (9).

$$m\ddot{x} + F_0\left(\frac{1}{ab}\right)\dot{x} + (SE - F_0)\left(\frac{a^3+b^3}{2a^3b^3}\right)x^3 = 0 \quad (6)$$

$$\kappa = \left(\frac{SE - F_0}{4aF_0}\right) \quad (7)$$

$$F_0 = SE\left(\frac{a - l_0}{l_0}\right) \quad (8)$$

$$\kappa = \frac{2l_0 - a}{4a(a - l_0)} \quad (9)$$

According to Equation (9) then depending on the initial values of a and $l_0$ different spring behaviors, (i.e. linear, softening or hardening) can be observed. Therefore, the MEMS designer can leverage such a mechanism by carefully choosing the design values to have a nonlinear structure leveraging either softening or hardening behavior.

Such a basis for a MEMS structure has been successfully employed in the literature to design nonlinear resonators with either spring softening or spring hardening characteristics. For example Jia et al. in "Twenty-Eight Orders of Parametric Resonance in a Microelectromechanical Device for Multi-band Vibration Energy Harvesting" (Scientific Reports, Vol. 6, p. 30167, July 2016) reported a resonator designed to have softening behavior. Whilst Hajati et al. in "Ultra-wide bandwidth piezoelectric energy harvesting," (Applied Physics Letters, vol. 99, no. 8, p. 083105, August 2011) and Gafforelli et al. in "Experimental verification of a bridge-shaped, non-linear vibration energy harvesters" (IEEE Sensors, November 2014, pp. 2175-2178) resonators with spring hardening behavior are presented. A similar but more complex structure such as the one presented by Nabavi et al. in "Nonlinear Multi-mode Wideband Piezoelectric MEMS Vibration Energy Harvester" (J. IEEE Sensors, pp. 1-1, 2019) employing three proof masses also exhibited spring hardening behavior. However, to the best knowledge of the authors, no MEMS resonator micro-structure based on the weighted string has been implemented within the prior art to exhibit either spring softening or hardening behavior.

It should be noted that the weighted string is not the only architecture that allows for the designer to control the type of nonlinearity exhibited by the system. As such, Zega et al. in "Hardening, Softening, and Linear Behavior of Elastic Beams in MEMS: An Analytical Approach" (J. Microelectromechanical Systems, vol. 28, no. 2, pp. 189-198, April 2019) have shown that the coupling of 45° inclined springs will result in either spring hardening, spring softening and even linear behavior. However, the focus of that work is more on the analytical modelling of such nonlinearity. Work presented by Cho et al. in "Nonlinear hardening and softening resonances in micromechanical cantilever-nanotube systems originated from nanoscale geometric nonlinearities," (Int. J. Solids and Structures, vol. 49, no. 15, pp. 2059-2065 August 2012) showed that the coupling of two cantilevers with a multiwalled boron nitride nanotube (BNNT) can result in either spring hardening or spring softening. However, this method requires post-processing of the MEMS and only has been demonstrated at the nanoscale.

Section A2. Design and Micro-Fabrication Process

A2A. Design

Figure 4:
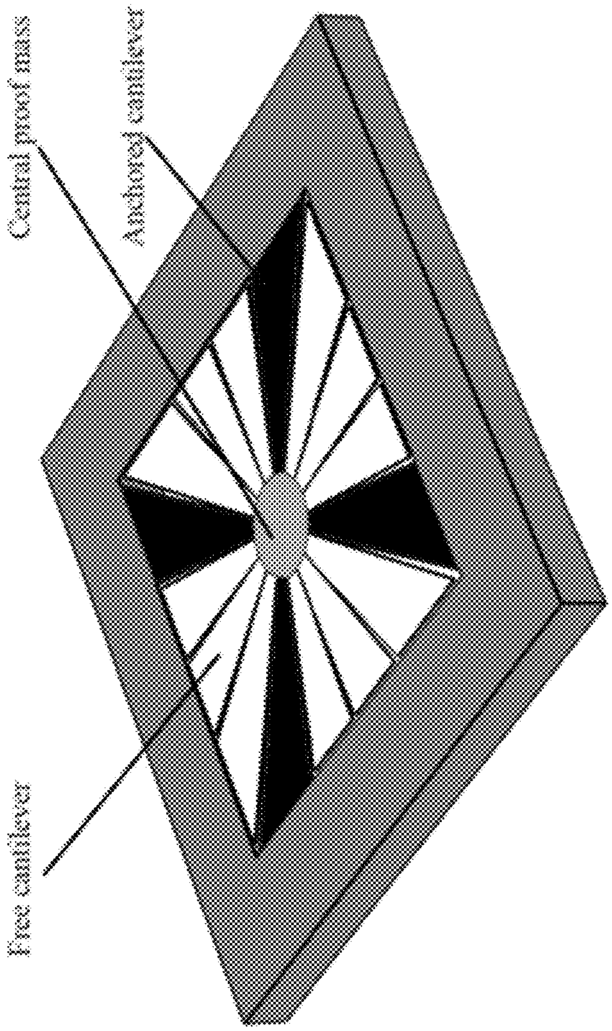
FIG. 4 depicts an anchoring scheme for a square daisy (SD) MEMS resonator.

As was previously discussed, MEMS architectures with a nonlinear behavior have been proposed in the literature. However, few allow for the control of their nonlinear behavior to support either spring softening or hardening behavior. Below, the inventors outline their study of one of these architectures, the squared daisy (SD) structure, with respect to its nonlinear behavior. This architecture was presented for the realization of a MEMS piezoelectric vibration energy harvester (VEH) by the inventors in "Impact of Geometry on the Performance of Cantilever-based Piezoelectric Vibration Energy Harvesters" (IEEE Sensors, pp. 1-1, 2019). The SD structure can be partially simplified to the weighted string structure as it consists of a central proof mass (or diaphragm) acting as the weight suspended by a predefined number of cantilevers of varying cross sections as shown in FIG. 4. These cantilevers can either be anchored or free. By choosing which of the cantilevers will be anchored and function as the string, and the ones that are only clamped on the central proof mass, the MEMS designer can carefully determine the spring-mass parameters of the structure. In FIG. 4, the free cantilevers are illustrated in white, whilst the anchored ones (i.e. supports) are shown in black, as distributed around the central mass. The design as depicted in FIG. 4 employing 16 cantilevers although it would be evident that this may be varied without departing from the scope of the invention.

A basic analytical analysis of the resonant frequency, in the SD structure was presented in "Impact of Geometry on the Performance of Cantilever-based Piezoelectric Vibration Energy Harvesters" (IEEE Sensors, pp. 1-1, 2019), where it was shown that the fundamental resonant frequency of such structure can be expressed by Equation (10) where E is the Young's modulus of the material, I is the area moment of inertia, which depends on the physical dimensions of the device, $R_m$ is the radius of the proof mass, H is the height of the proof mass, ρ is the density of the material, L is the length of the structure, and $S_C$ Sc denotes the scaling factor.

$$f_0 = \left(\frac{1}{2\pi}\right) * \sqrt{\frac{48EI}{(2\pi R_m \rho H) * (L - (2R_m)S_C)}} \quad (10)$$

However, it should be noted that these equations can only be used for an approximate estimation of the resonant frequency, since the cross-sectional area in the proposed MEMS nonlinear resonator is not uniform over the entire cantilever length. Furthermore, this analytical model does not take into account the nonlinear behavior of the system.

In terms of behavior, the displacement of the central mass is expected to dictate the global behavior of the system. If this displacement is small, then the spring constant of the anchoring cantilevers can be assumed as linear, and therefore the global behavior of the structure will be linear. However, for larger displacements, the supporting cantilevers will be deflected and stretched, eventually exhibiting non-linear behavior. This implies that the spring constant of the SD will vary with the magnitude of the displacement. To predict the behavior of the supporting cantilevers, it is necessary to either make an analytical model or use FEM simulations.

Therefore, to validate and accurately predict the behavior of the SD structure under different anchoring schemes, simulations have been performed using the COMSOL Multiphysics software package. These simulations are aimed to extract the mode shape, resonant frequency and spring constant under varying loads when the anchoring scheme is changed.

Figure 5:
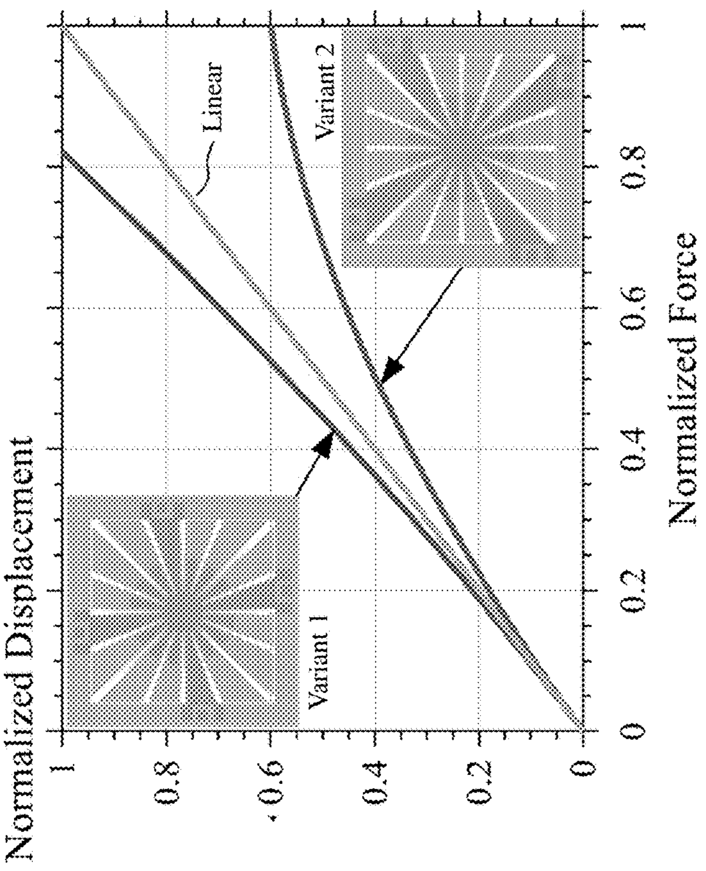
FIG. 5 depicts the influence of a force applied on the deflection of the central proof mass for two variants of SD MEMS resonator.

As a result of this process, two SD variants have been defined. The parameters to describe these variants are presented in Table I. The results of the simulation of the behavior of such variants, under different loads, are shown in FIG. 5. Consequently, it has been shown that the SD structure has the potential to exhibit either softening or hardening behavior depending on its anchoring scheme, since such an anchoring scheme effectively changes the behavior of spring in the presence of large enough displacement. This is in line with the general results shown in FIG. 1. The thicknesses and the geometry of the different layers have been chosen to match the guidelines of the PiezoMUMPs micro-fabrication process from MEMSCAP (a commercial MEMS foundry). The selected anchoring schemes are presented in Table 1 and shown in FIG. 5. It should be noted that due to the rotational symmetry in the SD structure, several configurations result in the same anchoring scheme.

TABLE 1

Overview of the Parameters for Each of the SD Resonator Design Variants

| | Variant 1 | Variant 2 |
|---|---|---|
| Size of Design (μm) | 1700 × 1700 | |
| Proof Mass Radius (μm) | 200 | |
| Substrate Thickness (μm) | 400 | |
| Cantilever Thickness (μm) | 10 | |
| Anchor Cantilevers | 1, 5, 9, 13 | 3, 7, 11, 15 |
| Free Cantilevers | 2, 3, 4, 6, 7, 8, 10, 11, 12, 14, 15, 16 | 1, 2, 4, 5, 6, 8, 9, 10, 12, 13, 14, 16 |
| Resonant Frequency (Hz) (simulated) | 8100 | 4050 |
| Hardening (simulated) | Hardening | Softening |

A2B. Fabrication

To experimentally validate and study the effects of nonlinearity on the SD structure, the variants previously presented were fabricated. In this section, the PiezoMUMPs microfabrication process to prototype the MEMS resonators described above is described. This process provides cost-effective access to piezoelectric MEMS prototyping. In the literature, this process has been reported for the implementation of various MEMS-based resonators and VEH devices, see for example:

Nabavi et al. Nonlinear Multi-mode Wideband Piezoelectric MEMS Vibration Energy Harvester," IEEE Sensors Journal, pp. 1-1, 2019;

Gratuze et al. "Design of the Squared Daisy: A Multi-Mode Energy Harvester, with Reduced Variability and a Non-Linear Frequency Response," Sensors, vol. 19, no. 15, p. 3247 January 2019;

Alameh et al. "Impact of Geometry on the Performance of Cantilever-based Piezoelectric Vibration Energy Harvesters," IEEE Sensors Journal, pp. 1-1, 2019;

Robichaud et al. "Electromechanical Tuning of Piecewise Stiffness and Damping for Long-Range and High-Precision Piezoelectric Ultrasonic Transducers," Journal of Microelectromechanical Systems, pp. 1-10, 2020;

Pons-Nin et al. "Design and test of resonators using PiezoMUMPS technology" 2014 Symposium on Design, Test, Integration and Packaging of MEMS/MOEMS, pp. 1-6; and Alameh et al. "Effects of Proof Mass Geometry on Piezoelectric Vibration Energy Harvesters," Sensors, vol. 18, no. 5, p. 1584 May 2018.

Figure 6:
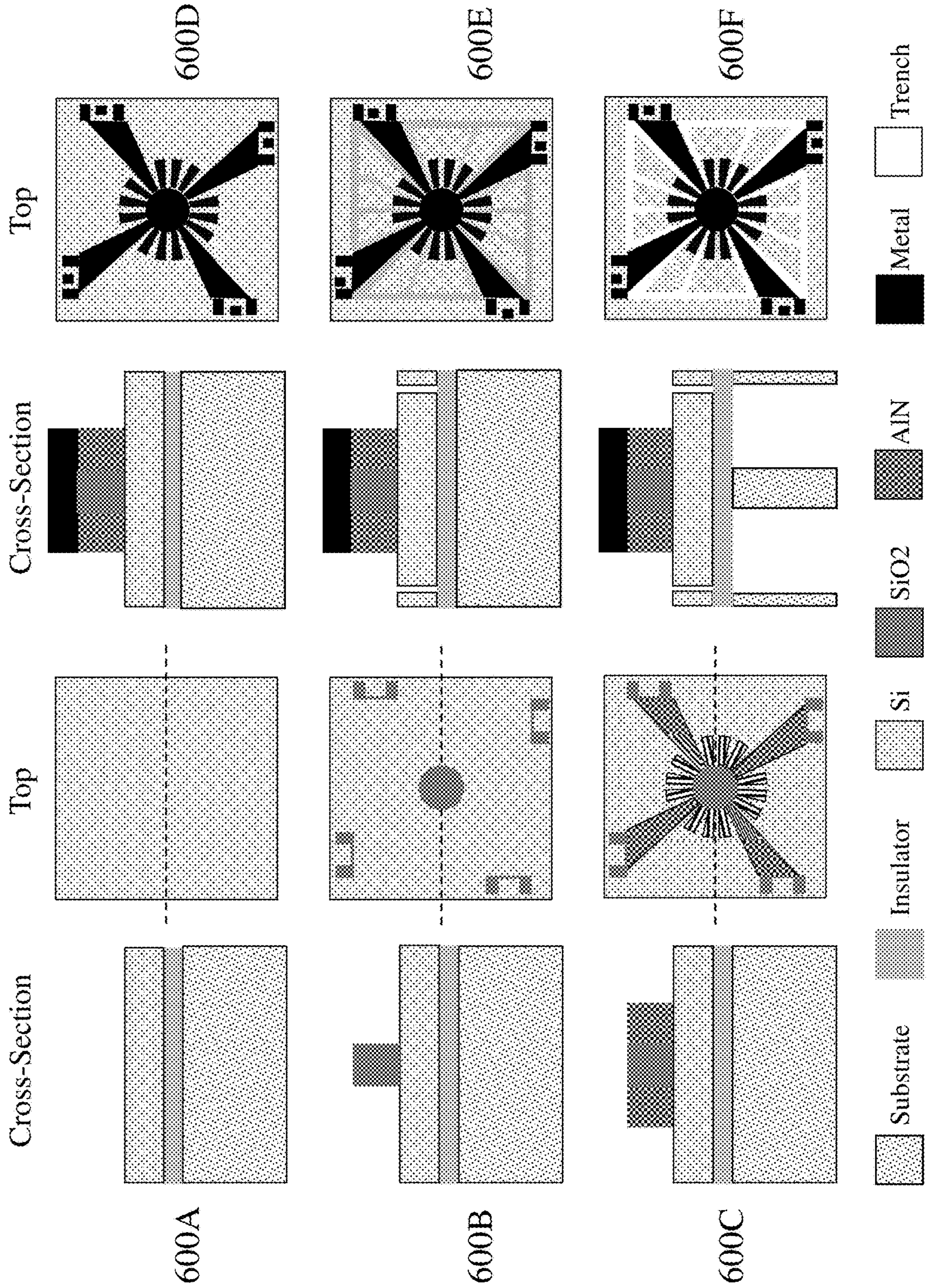
FIG. 6 depicts a simplified PiezoMUMPs fabrication process flow for the SD MEMS resonators employed by the inventors.

The fabrication process, as depicted in FIG. 6, includes five masks based on an N-type double-side polished silicon-on-insulator (an) wafer. In the first step, a 10 μm-thick silicon layer (First image 600A) is doped in order to increase its electrical conductivity for use as a bottom electrode. Thereafter, an insulating 0:2 μm-thick layer of silicon dioxide is grown and patterned on the SOI wafer (Second image 600B). A 0:5 μm-thick piezoelectric layer of aluminum nitride (AlN) is then deposited and patterned (Third image 600C). In the next step, a layer of metal is deposited, consisting of a stack of 20 nm-thick chromium (Cr) and of 1 μm-thick aluminum (Al). This layer is used as the top electrode (Fourth image 600D). The silicon device layer is then patterned to create the suspended structure (Fifth image 600E). Then, the 400 μm substrate is etched from the backside of the wafer to form the trench below the structure to release it (Sixth image 600F). It is worth noting that this process allows for the use of the suspended substrate to be used as a proof mass. Accordingly, in the case of the SD structure, the trench step also frees the proof mass to enable it to vibrate. Upon reception of the device from the foundry, no post-processing step has to be applied to the manufactured devices. Additional information regarding the fabrication process can be found in Cowen et al. "PiezoMUMPs design handbook" (MEMSCAP Inc, 2014).

The layouts for both SD resonator variants as defined in Table I were implemented. The fabricated resonators occupy a total silicon area of 1700 by 1700 μm, and are shown in first and second images 700A and 700B respectively for Variant 1 (hardening) and Variant 2 (softening respectively). In this figure, the proposed anchoring schemes and the point used for the vibration measurement are shown (denoted by the X on the centre of the proof mass.

Section A3. Experimental Results

A3A. Description of the Experimental Test Setup

To characterize the hysteresis and nonlinearity behaviors of the MEMS resonators the following approach was conducted. The prototyped SD resonators were electrically excited, while their mechanical responses were measured by an optical vibrometer. It is worth mentioning that in the case of MEMS piezoelectric transducers, a mechanical or an electrical excitation will yield a similar behavior in frequency. In the present case, an electrical excitation was used since a simpler measurement setup is required for that purpose.

Figure 8:
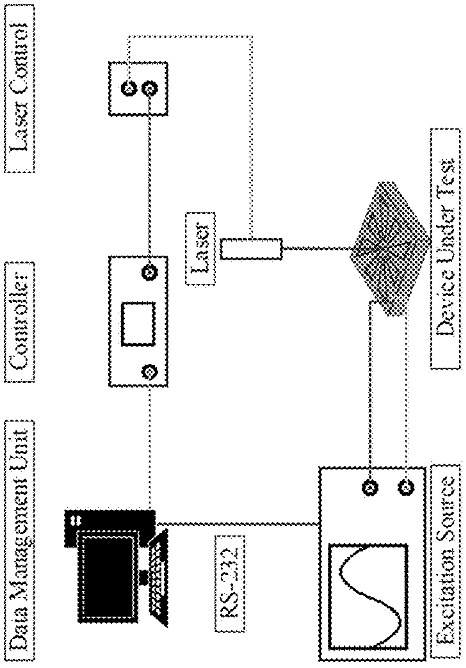
FIG. 8 depicts a schematic of a vibrometer test bench employed in characterising the SD MEMS resonator devices.

The experimental test setup depicted schematically in FIG. 8 using laser based vibrometry measurements. In order to satisfy the Nyquist-Shannon sampling theorem, the sampling frequency $F_S$ for all the measurements was set to be 25:6 kHz. To excite the prototyped MEMS resonators, a function generator was used which was controlled by a serial interface to provide the desired voltage excitation signal. The deflection measurements of the free cantilevers will yield a similar response with a higher velocity due to the increased degree of freedom of such cantilevers, as shown by the inventors in Gratuze et al. "Design of the Squared Daisy: A Multi-Mode Energy Harvester, with Reduced Variability and a Non-Linear Frequency Response," Sensors, vol. 19, no. 15, p. 3247 January 2019.

A3B. Description of the Excitation Signals

The MEMS resonators were excited by using three different excitation voltage signals, namely, pulsed sweep (PS), where the excitation frequency is discretely swept, continuous sweep forward where the excitation frequency was swept in an ascending manner, and continuous sweep backward (CSB), where the excitation frequency was swept in a descending manner. The nature of these excitation voltage signals are described in further detail below.

In the nonlinear regime, the hysteresis is dependent on the prior state of the vibrating system. To eliminate the hysteresis effect in the characterization of the MEMS resonator, a pulsed sweep PS was defined. When excited with a PS type excitation, the MEMS devices are excited at a particular frequency $F_i$Fi, for a given duration of $T_{ON}$; afterwards the devices are turned off for a duration of $T_{OFF}$. The value of $F_i$ is sequentially swept between $F_{Start}$ and $F_{End}$, the lower and the higher excitation frequencies, respectively. The excitation frequencies are thus discrete, and the resolution of this PS is equal to the distance between two consecutive excitation frequencies, $F_{Res}$.

The PS excitation was carried-out with three main variations. In the first one, the excitation frequencies steps are applied in an increasing order. Then in the second, the excitation frequencies steps are applied in a decreasing order. Finally, in the third, the excitation frequencies steps are applied in a random order. These sweeps have been named pulsed sweep forward (PSF), pulsed sweep backward (PSB), and pulsed sweep random (PSR), respectively. By performing these three pulsed sweeps, the test setup can be validated, and the hysteresis effect of the characterization can be eliminated (i.e., by using a sufficient $T_{OFF}$ duration to eliminate the hysteresis in the system). It should be noted that, the resolution in frequency for this characterization mode is equal to $F_{Res}$ and is affected by neither the sampling frequency nor the duration of the excitation (provided that the Nyquist-Shannon sampling theorem is respected).

Figure 9:
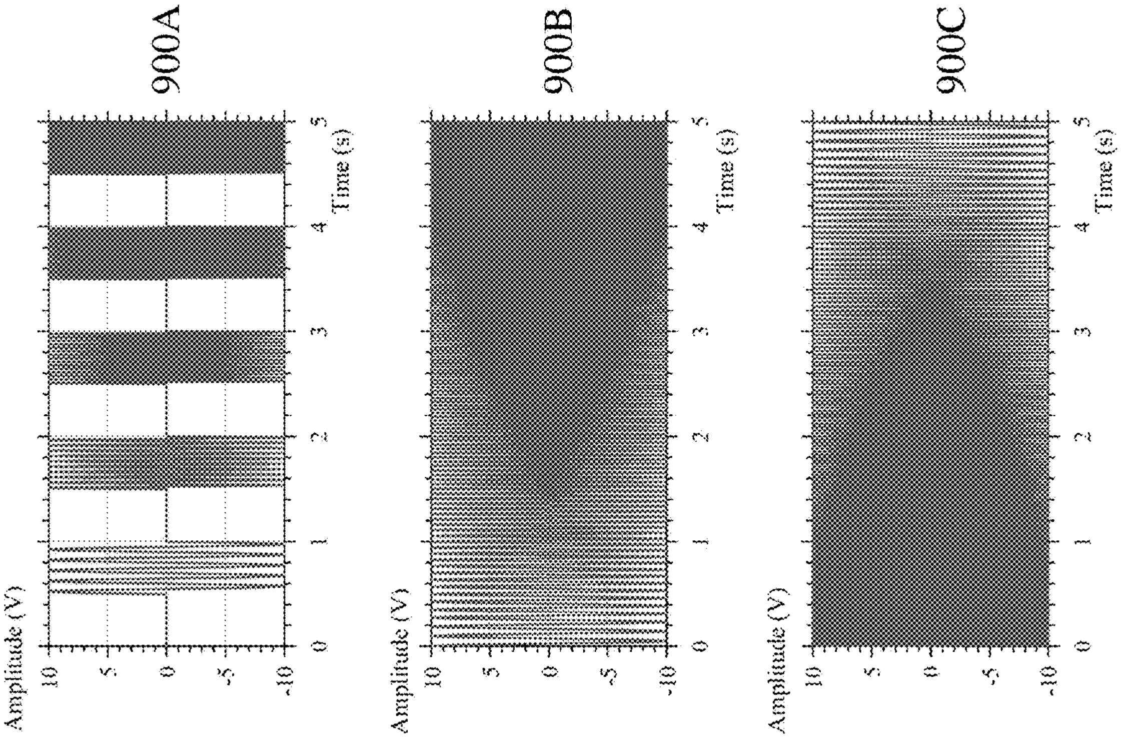
FIG. 9 depicts exemplary excitation signals of pulsed sweep forward (PSF), continuous sweep forward (CSF) and continuous sweep backward (CSB) as employed by the inventors.

An illustration of the excitation signal for the (PSF) is shown in first image 900A in FIG. 9. In this case, the amplitude of the excitation signal was set to be 20V, while, $F_{Start}$ and $F_{End}$ were 10 Hz and 50 Hz, respectively. $F_{Res}$ being 10 Hz. The duration of $T_{ON}$ and $T_{OFF}$ are identical, i.e. 0:5 s. The overall excitation is conducted over a duration of $T_S$=5 seconds.

In order to exert the hysteresis behavior of the devices, two continuous sweep excitation signals were used, where the frequency was swept continuously in an ascending manner, named continuous sweep forward (CSF), and in a descending manner, named continuous sweep backward (CSB). For these excitation signal sweeps, the start and end frequencies of the sweep ($F_{Start}$ and $F_{End}$) as well as the duration of the excitation $T_E$ were set. These parameters results in a sweep rate $S_r$ and a resolution in frequency $F_{res}$. $S_r$ can be expressed as given by Equation (11). However, experimental results have shown that the value of $S_r$ does not have an influence on the behavior in frequency of the resonators. In contrast, $F_{Res}$ is dependent on the sampling frequency $F_S$ and the number of points considered for the fast Fourier transform (FFT) operation, $N_{FFT}$, and can be expressed as given by Equation (12).

$$S_r = \left| \frac{F_{End} - F_{Start}}{T_E} \right| \tag{11}$$

$$F_{Res} = F_S / N_{FFT} \tag{12}$$

As the value $N_{FFT}$ is a function of the duration of the excitation, reducing the value of $T_E$Te will increase the value of $F_{Res}$, and therefore reduce the ability to accurately characterize the behavior of the nonlinear MEMS resonator. This effect can be partially compensated by using zero-padding on the measured signal as this operation will artificially augment the number of points considered for the FFT operation.

An illustration of the excitation signals for the CSF and CSB excitation are depicted in second and third images 900B and 900C respectively in FIG. 9. With reference to this figure, the amplitude of the excitation signal is 20V. The lower and higher frequencies are 10 Hz and 50 Hz, respectively. The excitation duration is Te=5 s.

It should be noted that the term "frequency response" is essentially inaccurate for nonlinear resonators, as the hysteresis effect comes into action. Hence more accurately described, the behavior should be considered the response in frequency of the resonator as caused by a defined stimulus. In the case of nonlinear resonators, contrary to linear resonators, the resonant frequency varies as a function of the amplitude of the excitation signal and the type of excitation provided to the resonator (i.e., while for a linear resonator knowing the amplitude and frequency of the excitation is enough to determine the displacement of the resonator, in the case of nonlinear resonators, the previous state should also be specified to allow such determination). This effect is demonstrated below, where the responses of the devices over frequency to different excitation amplitude levels and to the different excitation signal types described above are outlined.

A3C. Signal Parameters for Each of the Excitation Signals

To allow for a comparison of the continuous sweeps forward and backward (CSF and CSB) signals, the sweep parameters were carefully chosen to allow a relative comparison between each of them. These parameters are presented in Table 2 where the parameters were chosen to provide a wideband excitation signal but also allow relative comparison between the two excitation schemes, as the value of $T_E$, $S_r$ and $F_{Res}$ were kept constant at 500 s, 8 Hz $s^{-1}$ and 2 mHz, respectively. In the case of the PS excitation, the parameters of the signal for both devices are presented in Table 3. These parameters have been chosen to provide a large band excitation signal, and also to allow a relative comparison between the (CSF and CSB) excitation signals. For these three types of excitation (PS, CSF and CSB), the measurements were performed for different signal amplitudes, namely 5V, 10V, 15V and 20V.

TABLE 2

| Characteristics of the CS Type Excitation Signal | | | | |
|---|---|---|---|---|
| | Excitation Type | $F_{Start}$ (kHz) | $F_{End}$ (kHz) | $T_E$ (s) |
| Variant 1 | CSF | 6 | 10 | 500 |
| | CSB | 10 | 6 | |
| Variant 2 | CSF | 2 | 6 | 500 |
| | CSB | 6 | 2 | |

TABLE 3

| Characteristics of the PS Type Excitation Signal | | | | | |
|---|---|---|---|---|---|
| | $F_{Start}$ (kHz) | $F_{End}$ (kHz) | $F_{Res}$ (kHz) | $T_{ON}$ (s) | $T_{OFF}$ (s) |
| Variant 1 | 6 | 10 | 10 | 1.06 | 0.53 |
| Variant 2 | 2 | 6 | | | |

A3D. Summary of the Measurements Results

Excitation with Continuous Sweep Signals

Figure 12A:
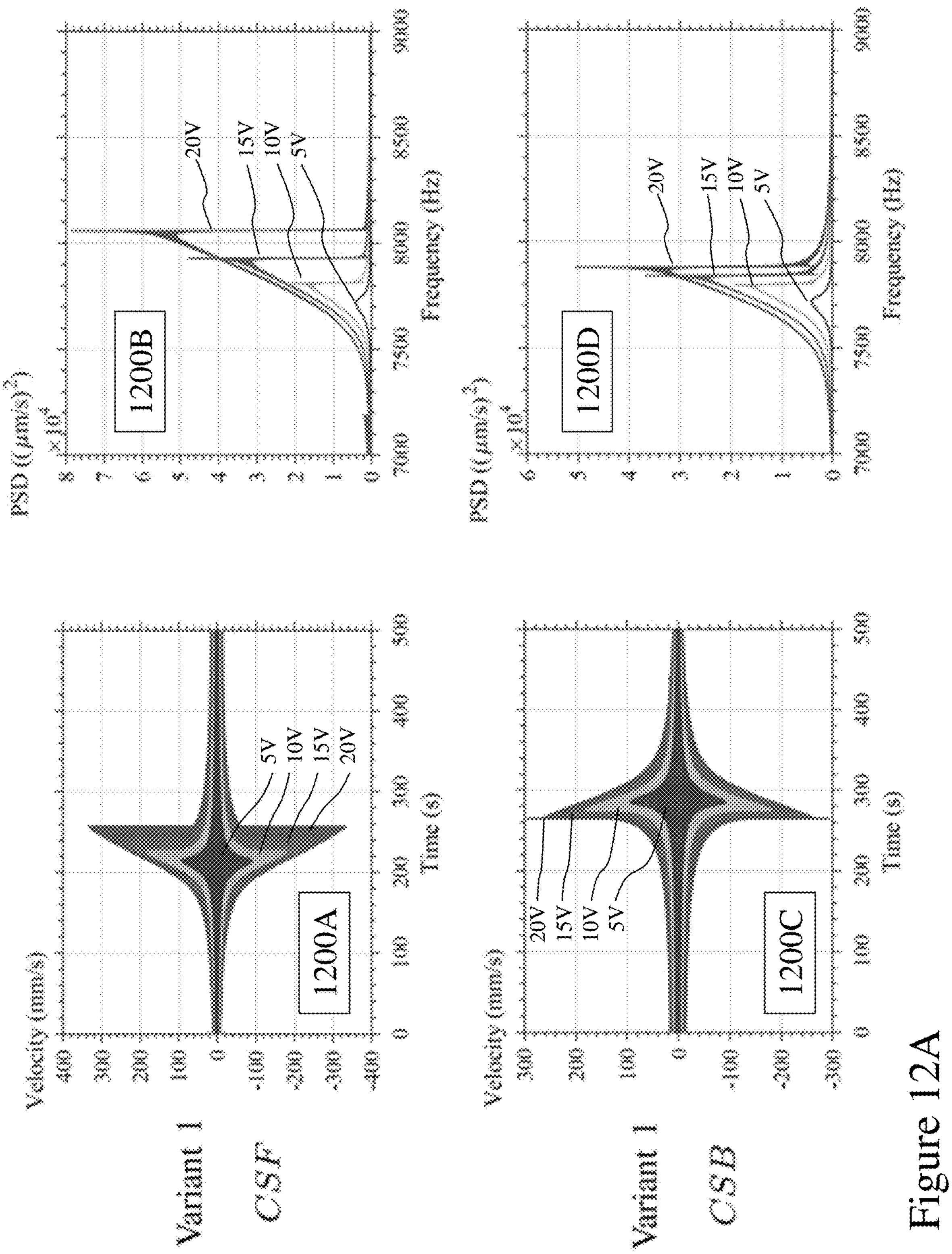
FIGS. 12A and 12B depict measurement results for CS type excitation for the SD MEMS resonator device variants with spring hardening and spring softening.
Figure 12B:
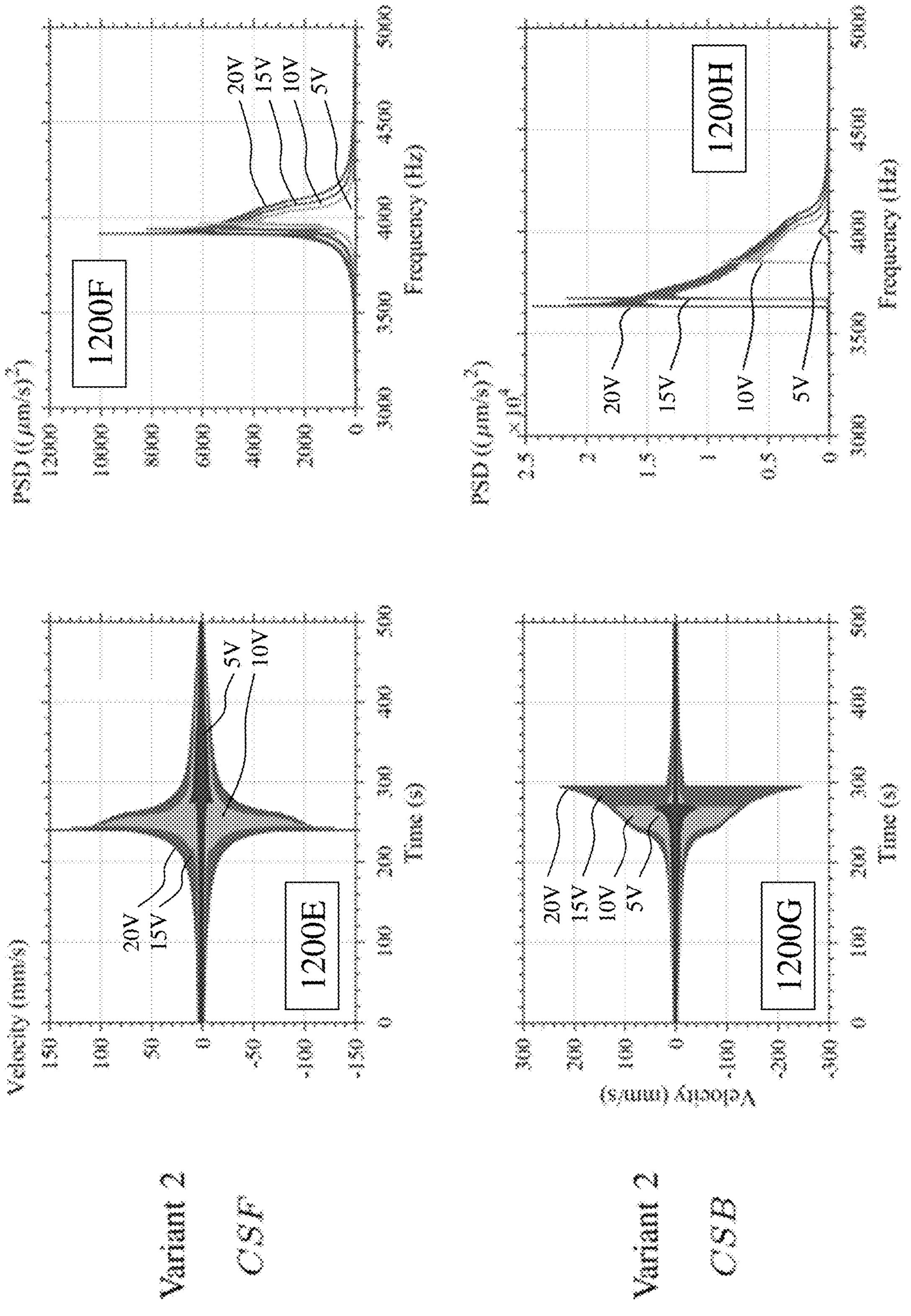

In FIGS. 12A and 12B respectively the responses of Variants 1 and 2 in the time domain are depicted along with the frequency content of such signal when the devices are excited with a CSF or CSB type excitation. For clarity, the frequency range shown in these Figures has been limited to the interval between 7 kHz and 9 kHz for Variant 1 and between 3 kHz and 5 kHz for Variant 2. Accordingly, there are depicted:

- First and second images 1200A and 1200B of time domain and frequency responses for Variant 1 under CSF excitation for the 4 different excitations voltages;
- Third and fourth images 1200C and 1200D of time domain and frequency responses for Variant 1 under CSB excitation for the 4 different excitations voltages;
- Fifth and sixth images 1200E and 1200F of time domain and frequency responses for Variant 2 under CSF excitation for the 4 different excitations voltages; and
- Seventh and eighth images 1200G and 1200H of time domain and frequency responses for Variant 2 under CSB excitation for the 4 different excitations voltages.

The influence of the excitation amplitude on the resonant frequency of the variants is clearly noticeable. For Variant 1, the greater the amplitude, the greater the resonant frequency. Such an increase is greater for CSF excitation. For Variant 2, the greater the amplitude, the lower the resonant frequency. Such a decrease is greater for CSB excitation.

Such results validate the simulation results which predicted a hardening type response for Variant 1 and softening type response for Variant 2. This also shows the dependency of the frequency domain behavior of nonlinear MEMS resonators in response to the type of excitation used.

Excitation with Pulsed Sweep Signals

Figure 13:
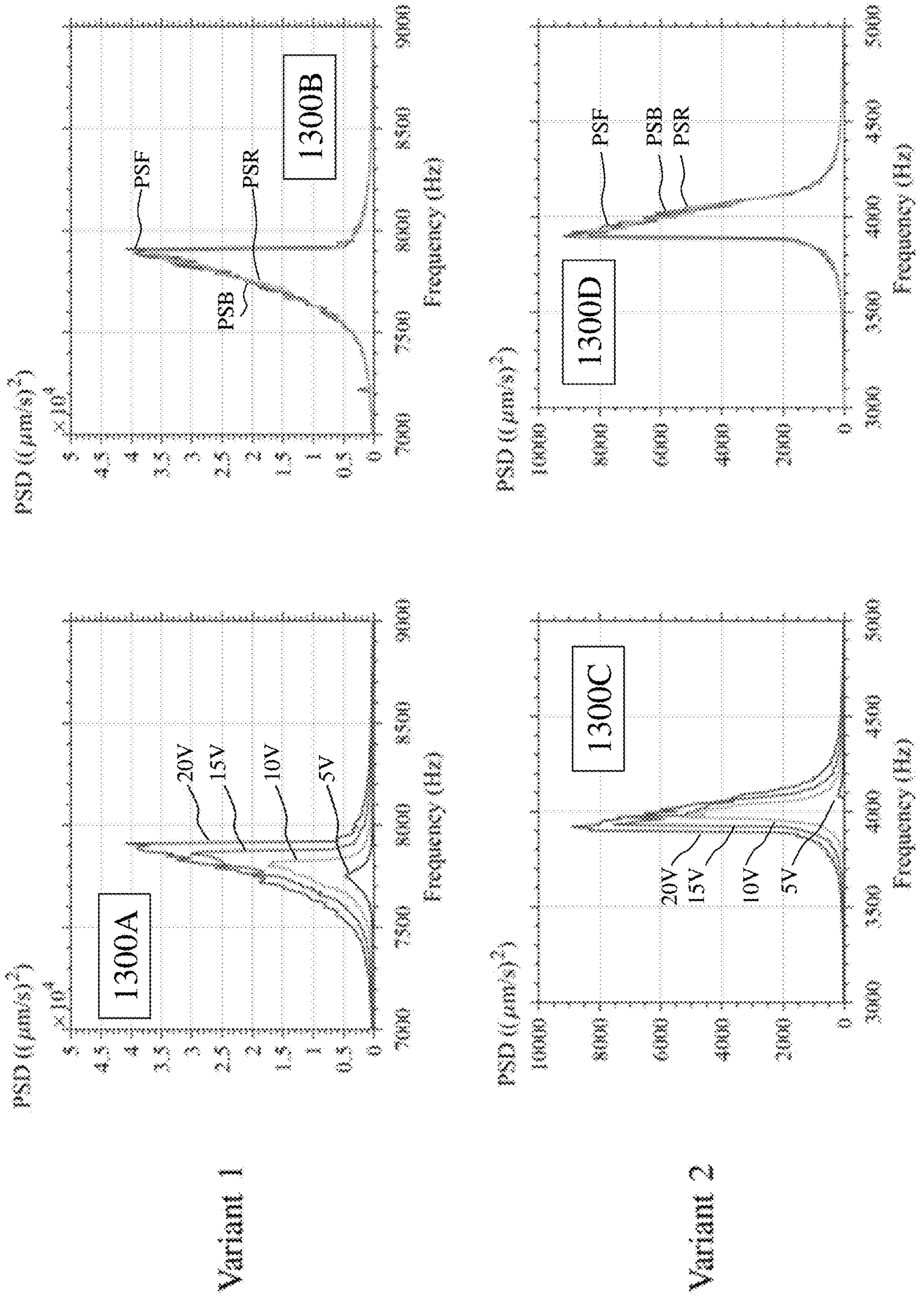
FIG. 13 depicts measurement results for PS type excitation for the SD MEMS resonator device variants with spring hardening and spring softening.

In FIG. 13, the behavior over frequency of both variants when varying the amplitude of the excitation signal is shown. For clarity, the frequency range shown in this figure has been limited to the interval between 7 kHz and 9 kHz for Variant 1 and between 3 kHz and 5 kHz for Variant 2. Accordingly, there are depicted:

- First image 1300A depicting the frequency responses for Variant 1 under PS excitation for the different excitations voltages;
- Second image 1300B depicting the frequency responses for Variant 1 under PS excitation for the different sequences of excitation frequency;
- Third image 1300C depicting the frequency responses for Variant 2 under PS excitation for the different excitations voltages; and
- Fourth image 1300D depicting the frequency responses for Variant 2 under PS excitation for the different sequences of excitation frequency.

The influence of the order in which the frequencies are applied when the devices are excited with a PS type excitation is evident in the images. As can be seen, the order in which the frequencies are applied has no significant impact on the behavior in frequency of both variants, as the results for the PSF, PSB and PSR are identical. Therefore, the characterization of the nonlinear resonators using a PS type excitation allows for the characterization of the nonlinear resonator devices without the effect of hysteresis.

These results validate the simulation results which predicted a hardening type response for Variant 1 and softening type response for Variant 2. This also validates that it is possible to mitigate the hysteresis behavior in nonlinear MEMS resonators by characterizing them using a PS type excitation.

Figure 10B:
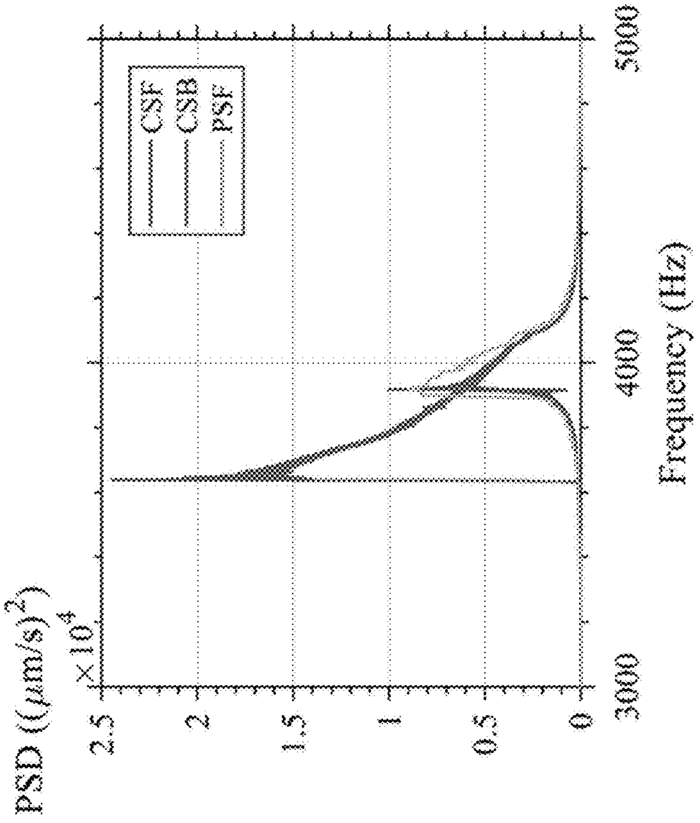
FIGS. 10A and 10B depict the influence of excitation signal type on the frequency behavior of SD MEMS resonator device variants with spring hardening and spring softening.
Figure 10A:
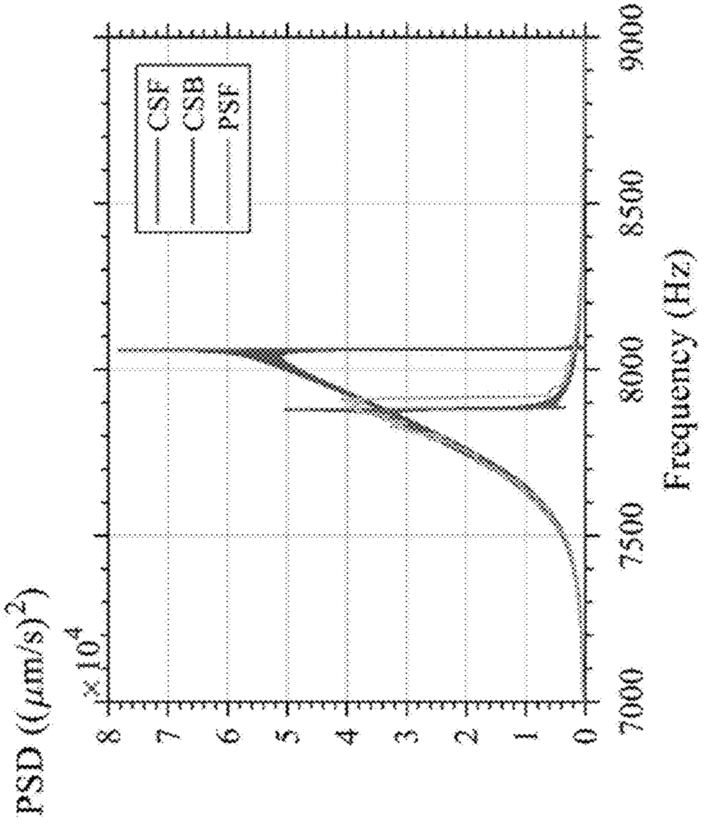

FIGS. 10A and 10B depict a summary of the measurements results for each variant under CSF, CSB and PSF type excitation. Within each figure the amplitude of the excitation voltage is 20V. The influence of the type of excitation on the behavior in frequency of the resonator can be clearly seen.

In Table 4 these measurement results are summarized. The influence on the amplitude of the excitation voltage and the type of excitation signal on the maximal velocity reached, resonant frequency, and bandwidth of both variants are presented. The measurements results using the pulsed sweep (PS) type excitation have been summarized in the columns PS as the PSF, PSB, and PSR type excitation yield similar results. In Table 4, the bandwidth has been defined as the full width at half maximum (FHWM) (i.e. the frequency range in which the amplitude is equal or greater than 50% of the maximal velocity reached).

TABLE 4

| Summary of the characteristics of each variant for different excitation signal types. | | | | | | | |
|---|---|---|---|---|---|---|---|
| | Excitation Voltage | Variant 1 | | | Variant 2 | | |
| | (V) | PS | CSF | CSB | PS | CSF | CSB |
| Maximum | 5 | 90.0 | 93.3 | 93.2 | 20.7 | 17 | 42.5 |
| Velocity | 10 | 176.6 | 151.5 | 181.7 | 95 | 95.7 | 118.0 |
| (mm $s^{-1}$) | 15 | 234.0 | 261.7 | 234.7 | 109.6 | 110.1 | 193.3 |
| | 20 | 271.1 | 334.2 | 268.9 | 122.1 | 120.5 | 228.1 |
| Resonant | 5 | 7750 | 7720 | 7716 | 4080 | 4197 | 4002 |
| Frequency | 10 | 75\800 | 7812 | 7797 | 3970 | 3969 | 3854 |

TABLE 4-continued

Summary of the characteristics of each variant for different excitation signal types.

| | Excitation Voltage | Variant 1 | | | Variant 2 | | |
|---|---|---|---|---|---|---|---|
| | (V) | PS | CSF | CSB | PS | CSF | CSB |
| (Hz) | 15 | 7860 | 7929 | 7839 | 3930 | 3942 | 3875 |
| | 20 | 7910 | 8058 | 7879 | 3920 | 3918 | 3638 |
| Bandwidth | 5 | 180 | 185 | 182 | 150 | 213 | 87 |
| (Hz) | 10 | 180 | 163 | 169 | 160 | 196 | 188 |
| | 15 | 230 | 234 | 193 | 180 | 156 | 265 |
| | 20 | 280 | 308 | 221 | 220 | 190 | 294 |
| Quality | 5 | 43 | 42 | 42 | 27 | 20 | 46 |
| Factor | 10 | 43 | 48 | 46 | 25 | 41 | 21 |
| | 15 | 34 | 34 | 41 | 22 | 25 | 14 |
| | 20 | 28 | 26 | 36 | 18 | 21 | 12 |

Figure 11A:
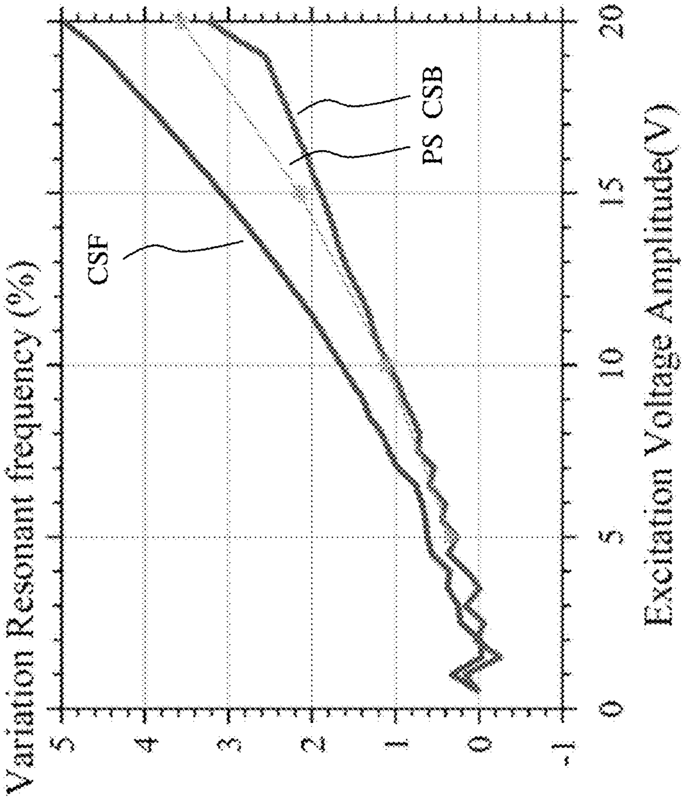
FIGS. 11A and 11B depict the influence of amplitude and excitation type on the resonant frequency of SD MEMS resonator device variants with spring hardening and spring softening.
Figure 11B:
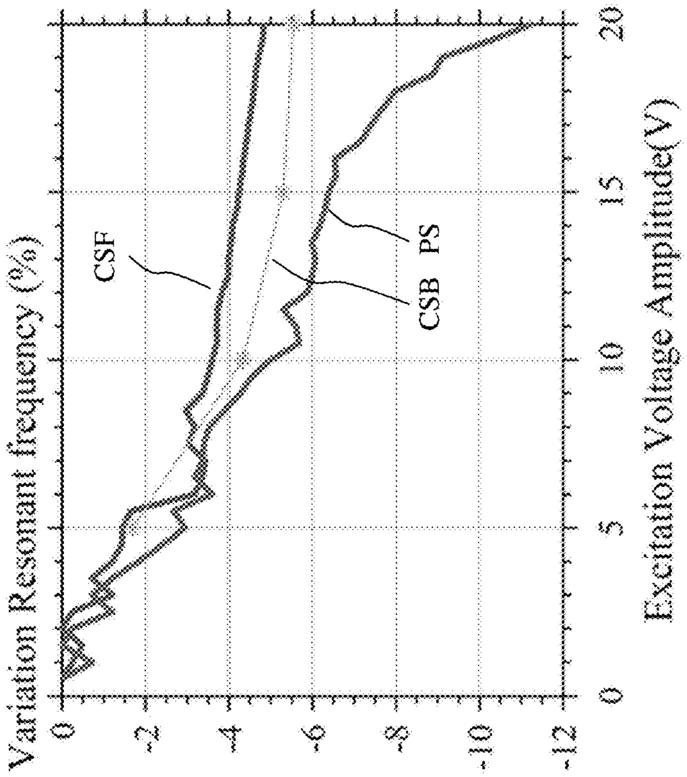

Contrary to the behavior of a linear resonator, for which the variation of the amplitude and type of the excitation signal does not result in variation of the resonant frequency, it can be seen that the behavior of both the variants in the frequency domain is highly dependent on the amplitude and type of the excitation signal. For all excitation types, increasing the amplitude of the excitation signal results in a higher resonant frequency for Variant 1, but in a lower resonant frequency for Variant 2. As shown in FIGS. 11A and 11B, for Variants 1 and 2 respectively, if the amplitude of the excitation voltage is constant, it can be observed that the reduction of the resonant frequency for Variant 2 is greater than the increase of the resonant frequency of Variant 1. This is in line with the simulations results shown in FIG. 5. As shown in that figure, at a constant force, the difference between the deflection of Variant 2 and the linear behavior is greater than the difference between the deflection of Variant 1 and the linear behavior.

It can be concluded that Variant 1 exhibits a hardening type spring softening, while Variant 2 exhibits a softening type spring softening. It is also shown that if the amplitude of the excitation signal is too low (below 3V), the amplitude of the excitation voltage does not have a strong influence on the resonant frequency and both devices appears to behave linearly as the displacement of the central proof mass is too small to induce the geometrical nonlinearity.

The frequency behavior of the device can be modified according to the excitation technique. As for Variant 1, as shown in FIG. 10A, it can be clearly seen that when the SD device is subjected to the CSF excitation signal, it has the larger displacement amplitude in comparison to the CSB excitation signal. While on the contrary for Variant 2, as shown in FIG. 10B, it can be seen that when the SD device is subjected to the CSB excitation signal, it has the larger displacement amplitude in comparison to the CSF excitation signal.

It is also interesting to note from FIGS. 10A and 10B that the characterization using the pulsed sweep (PS) type excitation (i.e., PSF, PSB, or PSR) will have a similar behavior to the characterization using CSB type excitation, but a slightly higher maximal velocity and resonant frequency for Variant 1. A similar observation can be made regarding Variant 2 and CSF type excitation. This can also be seen in FIGS. 11A and 11B, where the variation in the resonator frequency is plotted versus the excitation voltage, showing that as the amplitude is increased, the CSF type excitation for Variant 1 and the CSB type excitation for Variant 2 yield a resonant frequency that diverges significantly from that obtained using PS excitation. These variations are not linked to the resolution in frequency of the PS signal.

Consequently, as it has been simulated and measured, the SD structure has the potential to exhibit different nonlinear behavior depending on the selected anchoring scheme. Moreover, it has been shown that using a PS type excitation can allow for a relative control of the hysteresis in nonlinear resonators.

As noted earlier nonlinear resonators are being considered for the realization of different devices including, but not limited to, VEHs, resonators, switches and logic gates. Depending on the end application, the excitation of the nonlinear resonators will vary. If the nonlinear resonators are employed as actuators or sensors, they will be electrically driven at a defined frequency such that the behavior in frequency of these nonlinear resonators will be closer to the results obtained with the PS type excitation. If the nonlinear resonators are destined for energy harvesting applications, they will be subjected to the vibrations in the ambient. Due to their nature, mechanical vibrations cannot be predicted, and therefore the characterization of VEH using a method that will give different results depending on the previous state of the system will lead to inaccurate results. Accordingly, the inventors have established above that pulse swept signals should be chosen as the reference, as in the case of a PS excitation, the hysteresis effect is removed from the characterization.

Comparing the effect of such excitation signals on the characterization of the same resonator (Variant 1 or 2), the amplitude of the excitation signal has been set to 20V and the 3 different signals were applied: (PSF, CSF and CSB). For the pulsed sweep, for simplicity only the PSF results are presented as it has been previously demonstrated that it will yield a similar response to the other PS methods (PSB or PSR). The resulting maximal velocity, resonant frequency, bandwidth, quality factor and resonance amplitude are presented in Table 5 for both Variants. As explained previously, the reference has been set to the performances of the devices when excited with a PSF type excitation.

As such in the present case, characterizing a device presenting spring softening behavior with a CSF instead of a PS type excitation will lead to a global underestimation of its characteristics, as the maximal velocity, resonant frequency, and bandwidth will be underestimated by 1.31%, 0.05% and 13.64% respectively. This will lead to an overestimation of the quality factor of 16.67%. On the contrary, characterizing a device presenting spring softening behavior with a CSB instead of a PS type excitation will lead to a general overestimation of its characteristics, as the maximal velocity and bandwidth will be overestimated by 86.81%, and 33.64% respectfully, and an underestimation of both the resonant frequency and of the quality factor by 7.19% and 33.33%, respectively.

On the other hand, characterizing a device presenting spring hardening behavior with a CSF instead of a PS type excitation will lead to a global overestimation of its characteristics, as the maximal velocity, resonant frequency, and bandwidth will be overestimated by 23.28%, 1.87% and 10% respectively. This will lead to an underestimation of the quality factor of 7.14%. Characterizing a device presenting spring hardening behavior with a CSB instead of a PS type excitation will lead to a global underestimation of its characteristics, as the maximal velocity, resonant frequency, and bandwidth will be underestimated by 0.81%, 0.39% and 21.07% respectively. This will lead to an overestimation of the quality factor of 28.57%.

In the case of energy harvesters, this overestimation is particularly of interest, as the maximum output power is linked to the maximum displacement and therefore velocity reached by the resonator, and the operation range of the resonator is linked to the bandwidth of the resonance. Therefore, a figure of merit (FOM) has been defined as the product of the amplitude of the velocity at resonance by the bandwidth of the resonance. This FOM is therefore expressed in Hz mm $s^{-1}$. This FOM allows the realization of a compromise between bandwidth and amplitude of the displacement at resonance both weighted equally. This FOM is presented in Table 5 for Variants 1 and 2. This shows that the FOM can be skewed significantly depending on how the devices were characterized.

TABLE 5

Summary of the performances of the Variants 1 and 2 under different excitation with an excitation signal amplitude of 20 V.

| | Excitation Type | Variant 1 | Variant 2 |
|---|---|---|---|
| Overestimation of velocity (%) | CSF | −1.31 | 23.28 |
| | CSB | 86.81 | −0.81 |
| Overestimation of resonant frequency (%) | CSF | 0.05 | 1.87 |
| | CSB | −7.19 | −0.39 |
| Overestimation of bandwidth (%) | CSF | −13.64 | 10.00 |
| | CSB | 33.64 | −21.07 |
| Overestimation of quality factor (%) | CSF | 16.67 | −7.14 |
| | CSB | −33.33 | 28.57 |
| FOM (Hz mm $s^{-1}$) | PS | 26862 | 75908 |
| | CSF | 22895 | 102934 |
| | CSB | 67061 | 59427 |
| Overestimation of FOM (%) | CSF | 35.6 | −14.77 |
| | CSB | −21.71 | 149.64 |

Characterizing a device presenting a nonlinear behavior with a CSF type excitation will lead to an underestimation (−15% in the present case) or an overestimation (36% in the present case) of its characteristics depending upon whether the device is presenting a spring softening or spring hardening type behavior. On the other hand, characterizing a device presenting nonlinear behavior with a CSB excitation will lead to an overestimation (150% in the present case) or an underestimation (−22% in the present case) of its characteristics depending on the device is presenting a spring softening or spring hardening type behavior.

Therefore, the inventors have established that the characterization of nonlinear MEMS resonators should be performed using a PS type excitation. However, the characterization of a nonlinear resonator with such excitation can be a bit more complex to implement than the CSF and CSB excitations depending upon the available test equipment.

It should be noted that if PS type excitation is not available to the designer, the type of excitation used should be specified, to allow the reader to estimate if the characteristics presented are either overestimated or underestimated. Exceptions to this recommendation can be made if the excitation signal of the nonlinear resonators is known to exhibit a sweep in frequency while in use in a given end application, in which case the characterisation using a CSF or a CSB type excitation will lead to more accurate results depending on the type of the frequency sweep expected in the application.

Section B: Pulse Shaping with Nonlinear Piezoeelectric Ultrasonic Transducers

Piezoelectric micromachined ultrasonic transducers (PMUTS) offers better performance in terms of bandwidth, resolution and penetration than the traditional ultrasonic transducers at a low cost for ultrasonic applications. Whilst the following description is described and focused to ultrasonic transducers the procedures, methods, and designs outlined according to embodiments of the invention may be applied to piezoelectric micromachines acoustic transducers (PMATs) without departing from the scope of the invention. Further, whilst the following description is described and focused to piezoelectric MEMS transducers the procedures, methods, and designs outlined according to embodiments of the invention may be applied to nonlinear MEMS transducers without departing from the scope of the invention.

PMATs and PMUTs allow the creation and reception of acoustic signals. For PMUTS the operation frequency of these devices is quite large as depending on the device considered it ranges from a few kHz to a few MHz. The main application for these devices is imaging in both medical and non-medical applications, in addition to ranging and non-destructive testing.

Recent work on PMUTs has focused on improving their performance. This works includes techniques for overcoming the limitations due to process variation during fabrications, tuning methods for the resonant frequency of the PMUTs, augmenting the acoustic pressure generated by the PMUTs and creating dual frequency responses. Whilst these works generally commercially available MEMS fabrication processes on silicon wafers other work has focused on developing custom fabrication processes to improve the integration of PMUTs. As a result, the prior art focuses on fabrication and topology to improve the performance of the PMUTs. However, one parameter stays constant for all these devices, the excitation signal.

Pulse Shaping is enabled by modifying the excitation signal where it can be viewed that frequency modulation of the excitation signal turn results in the amplitude modulation of the displacement of the resonator. The inventors novel pulse shaping technique(s) are a direct application of the hysteresis in nonlinear resonators which is outlined and characterised in Section A where the modulation of the frequency content of the signal affects the amplitude of the acoustic signal and modulation of the amplitude of the excitation signal in turn controls the resonant frequency of the resonator. Accordingly, modifying the excitation signal with a modulation in frequency of the excitation signal results in a modulation in amplitude of the velocity of membrane. Thus, the benefits of Pulse Shaping include, for example:

Enabling the tuning of the resonant frequency of the MEMS using the amplitude of the excitation signal;

Using the resonator at a frequency that does not have to be resonant frequency;

Increasing the displacement of the membrane of the resonator; and

Control of the decay of the resonator.

The use of the nonlinear features of MEMS resonators for Pulse Shaping is of great interest as when compared to other resonators they are more likely to have a nonlinear response. Furthermore, these MEMS resonators are generally driven close to their nonlinear regime to increase their performance. Finally, the use of nonlinear MUTs seems to be the logical direction as more MEMS devices tend to use such phenomena such as accelerometers, energy harvesters, actuators, switches, and resonators for example.

Section B1. Background and Theory

B1A. Operating Principle of Ultrasonic Transducers

It should be noted that in addition to PMUTs, Capacitive Micromachined Ultrasonic Transducers (CMUTs) and Capacitive Micromachined Acoustic Transducers (CMATs) also exploit MEMS technologies where the main difference between them resides in the actuation mechanism which as indicated in their names are actuated using electrostatic force while PMUTs leverage a piezoelectric actuation. Generally, CMUTs are used in the high frequency domain (>1 MHz) while PMUTs in the low domain (<1 MHz). Whilst the follow description and results are directed to PMUTs the Pulse Shaping methodologies, algorithms, and systems as described according to embodiments of the invention can be applied to MUTs and/or MATs without departing from the scope of the information provided their behavior is nonlinear Ultrasonic transducers able to generate or sense an ultrasound energy. As such three main categories can identified: transmitters, receivers and transceivers. As their name indicate, transmitters are able to convert electrical signals into ultrasound, while receivers convert ultrasounds into electrical signals, and finally transceivers are able to transmit and receive ultrasound.

Ultrasonic transducers transform an AC signal into a mechanical signal where the typical excitation signal for the generation of ultrasound for PMUTs and CMUTs is the application of a sinusoidal signal at a defined amplitude A and frequency ω. In the case of CMUTS, a bias DC signal also needs to be applied to the transducer. The main types of waves received or generated are pulsed waves and continuous waves. In the first case, a predefined number of periods are sent within a defined period whilst in the second case the excitation of the transducer is continuous. However, these transducers cannot convert the electrical pulse into a perfectly matching pulse of the same shape. The shape of the emitted mechanical signal is a function of both applied electrical pulses and also of the frequency response of the transducer.

It should be noted that in addition to shaping the pulse in the time domain, it is possible modulate these pulses as a function of space. This operation is called beam forming and whilst outside of the scope of devices and embodiments described and depicted in respect of the following section of the specification it would be evident that the techniques described according to embodiments of the invention can be applied to discrete transducers within a beam forming transducer array, a subset of the transducers within the beam forming array or all transducers with in the beam forming network without departing from the scope of the invention.

Both PMUTs and CMUTs are resonators therefore the effective frequency at which they can operate is limited by resonant frequency and the quality factor of the resonator. The resonant frequency determines the frequency at which the ultrasonic signal can be generated and therefore the temporal resolution of the device. The greater resonant frequency the greater the temporal resolution. In contrast, the quality factor determines both the maximal amplitude of ultrasonic signals and distortion between the original excitation and generated ultrasound signals. A high quality factor will allow the generation of an ultrasound of a greater amplitude which improves the maximal distance of use but also reduces the spatial resolution of the transducer due to an increased decay time of the resonator. Therefore, to increase the performance of PMUTs, PMATs, CMUTS, and CMATs it is of interest to design devices able to signals with a high amplitude and a short duration or at least provide a solution allowing the reduction of the length of decay time of the transducer.

Finally, PMUTs, PMATs, CMUTS, and CMATs are fabricated using microfabrication processes which have some inherent variation from device to device. These variations are translated in variations of the resonant frequency of the resonators where in turn these variations decrease the sensitivity of PMUTs, PMATs, CMUTS, and CMATs as they are operating outside their resonant frequency. Accordingly, establishing a tuning mechanism of the as fabricated resonant frequency of the transducers would allow for an improvement in their performance.

B1B. Modeling Nonlinearities in MEMS Resonators

The dynamic response of MEMS resonators can be analytically expressed and analysed. This is outlined in Section A above.

Section B2. Simulation

B2A. Definition of a Nonlinear Resonator

In order to illustrate the impact of excitation as described and depicted in Section A a fictional duffing resonator is defined $H_R$. For such resonator, the parameters, m, ξ, $k_0$, $k_1$, and $k_2$, have been determined and are presented in Table 6. This set of parameters results in $f_0$=500.01 Hz, Q=314.16 and κ=1.8997. Accordingly, the resonator $H_R$ will have a hardening type behavior.

TABLE 6

Characteristics of the simulated resonator.

| | m | ξ | $k_0$ | $k_1$ | $k_2$ | $f_0$ | Q | κ |
|---|---|---|---|---|---|---|---|---|
| $H_R$ | $1 \times 10^{-4}$ | 0.001 | 987 | 0 | 10 | 500.01 | 314.16 | 1.8997 |

Figure 14:
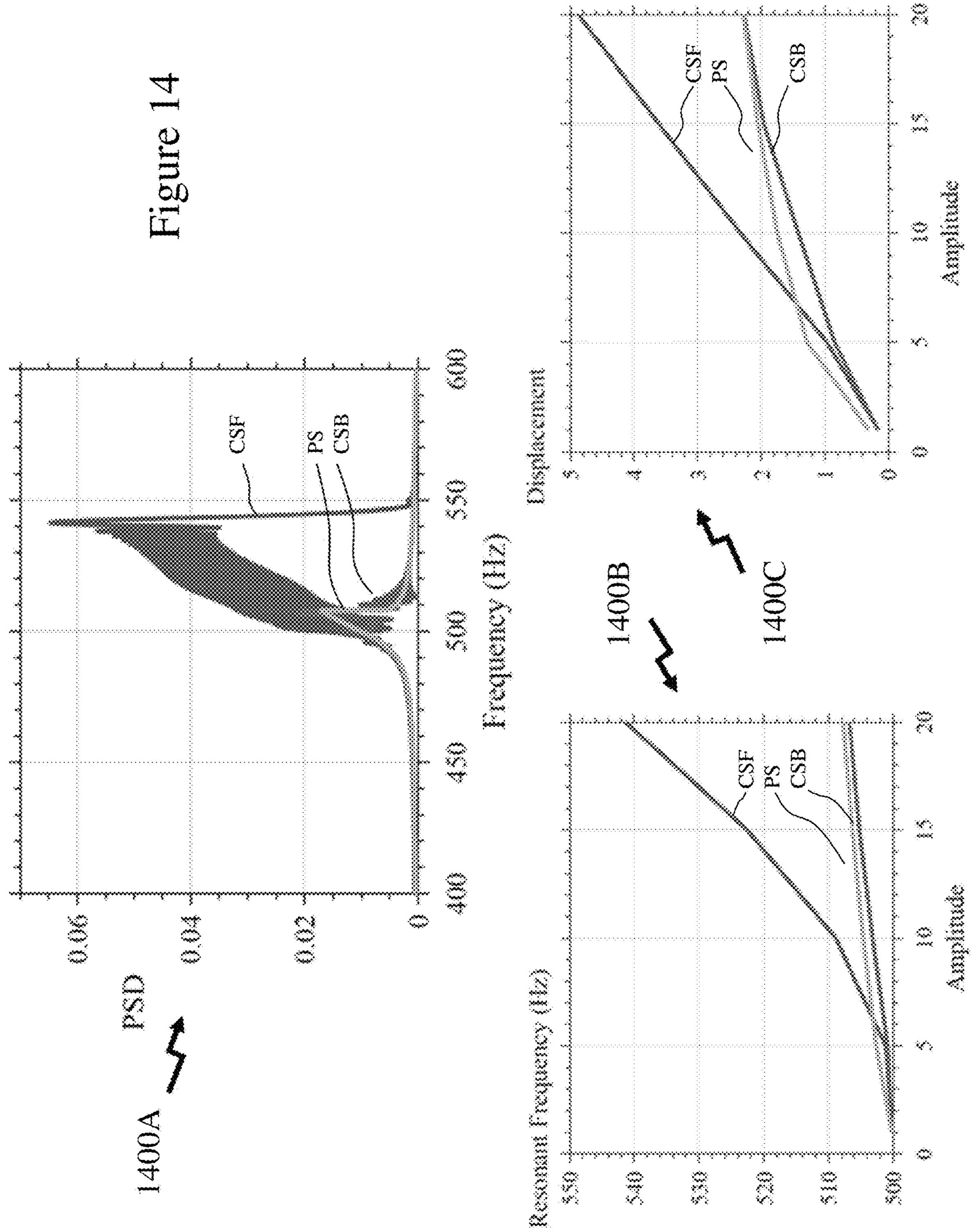
FIG. 14 depicts the impact of type of excitation signal on derived measurements for exemplary SD MEMS resonators.

The behavior of $H_R$ was simulated using MATLAB with the ordinary differential equation solver. FIG. 14 depicts the behavior of $H_R$ between 400 Hz and 600 Hz using three different excitation signals with a constant amplitude A=20 V. In the first case, the frequency is continuously increased this signal has been named continuous sweep forward (CSF). In the second case, the frequency is continuously decreased this signal has been named continuous sweep backward (CSB). In the third case the behavior is characterized for each frequency discretely, this signal has been named pulsed sweep (PS). Accordingly, referring to FIG. 14 first image 1400A depicts the impact of varying the excitation signal for constant amplitude. Second image 1400B depicts the impact of varying the amplitude of the excitation signal upon the measured resonant frequency for the different excitation signals. Third image 1400C depicts the impact on the maximum displacement for varying the amplitude of the excitation signal for the different excitation signals. This behavior is as expected as it is in agreement with the behavior of a hardening type nonlinear resonator as predicted by $\kappa$=1.8997.

The characteristics of $H_R$ have been extracted for three values of A namely, 10, 15 and 20. In particular the maximum displacement and the frequency at which this displacement is reached were extracted. These results are compiled in Table 7. As seen from this table, the amplitude or the excitation signal can be used as a simple tuning mechanism or the frequency at which the maximum displacement is reached. Hence, for a hardening type nonlinear resonator an increase in the amplitude of the excitation leads to an augmentation of the resonant frequency of the $H_R$.

TABLE 7

Performance of simulated resonator

| | Excitation Amplitude | CSF | CSB | PS |
|---|---|---|---|---|
| Maximum displacement | 10 | 2.324 | 1.417 | 1.747 |
| | 15 | 3.610 | 1.962 | 2.052 |
| | 20 | 4.877 | 2.270 | 2.287 |
| Resonant frequency (Hz) | 10 | 508.9 | 503.2 | 504.6 |
| | 15 | 522.6 | 505.2 | 506.3 |
| | 20 | 541.3 | 506.8 | 507.8 |

In of nonlinear MUTs, increasing the amplitude of the excitation signal can function as a frequency tuning mechanism. As shown in FIG. 14 and Table 7, increasing the value of A leads to an increase of F. However, as illustrated in Table 7, applying a sinusoidal signal at a defined amplitude A and frequency $\omega$, which corresponds to the PS type excitation, does not allow the leveraging of the maximum displacement of the resonator. When the $H_R$ is excited with a CSF type excitation, the maximum displacement reached is greater than the one that can be obtained using a PS type excitation.

It should be noted that while this demonstration has been made using a nonlinear resonator with a hardening type response. it is possible to do a similar exercise with a nonlinear resonator exhibiting a softening type response. In such case a similar simple tuning mechanism of the frequency at which the maximum displacement is reached is possible through use of the amplitude of the excitation signal. However, in the softening type response resonator increasing the amplitude of the excitation signal reduces this frequency as softening type resonators are characterized by having $\kappa$<0.

B2B. Increasing the Amplitude of Displacement

Nonlinear resonators exhibit a hysteresis phenomenon, this being the underlying cause from which the CSF type excitation is able to leverage a greater displacement than the PS one. Accordingly, the inventors have established a control methodology to increase the displacement of the resonator by exploiting this hysteresis.

As such a modified excitation signal has been established comprising the following segments:

- Segment 1: between t=0 and $t=t_1$, no excitation is provided;
- Segment 2: between $t=t_1$ and $t=t_2$ the excitation is applied and the frequency of excitations is increased from $f=F_1$ to $f=F_2$;
- Segment 3: between $t=t_2$ and $t=t_3$ the frequency of excitations is kept constant at $f=F_2$;
- Segment 4: between $t=t_3$ and $t=t_4$ no excitation signal is applied.

The amplitude of the excitation signal was kept constant during the second and third segments within the results described and depicted, however, it would be evident that this may vary between segments and within each segment. The maximum displacement should stable and provided during third phase at $f=F_2$.

Accordingly, the modified excitation signal can be described as comprising an initial segment (segment 2) with a subsequent segment (segment 3) wherein:

- the initial segment has a predetermined duration and a predetermined amplitude and the frequency of the excitation signal sweeps from a first predetermined frequency to a second predetermined frequency over the duration of the initial segment;
- the subsequent segment immediately follows the initial segment and has another predetermined duration and another predetermined amplitude but now the frequency of the excitation signal is kept constant at the second predetermined frequency; and
- the first predetermined frequency and second predetermined frequency as evident from the discussions above and below are established in dependence upon whether the non-linear resonator is a hardening type resonator or a softening type resonator.

Further, the excitation signal can be optionally defined as having a segment immediately prior to the initial segment (segment 1) where no excitation is applied to the non-linear MEMS resonator and a final segment immediately after the subsequent segment (segment 4) where no excitation is applied to the non-linear MEMS resonator.

Further, from the discussions above and below the first predetermined frequency and second predetermined frequency are not the resonant frequency of the non-linear resonator and a the displacement of the proof mass of the non-linear resonator when driven by the excitation signal exceeds that of the non-linear resonator when driven at its resonant frequency.

As noted the amplitude of the excitation signal can vary according to one or more factors including, but not limited to, the characteristics of the nonlinear resonator and the required temporal displacement of the resonator and/or the signal it generates. Accordingly, the modified excitation signal can be further described as comprising an initial segment (segment 2) with a subsequent segment (segment 3) wherein:

- the initial segment has a predetermined duration where the excitation signal sweeps from a first predetermined frequency and first predetermined amplitude to a second predetermined frequency and second predetermined amplitude over the length of the initial segment;
- the subsequent segment immediately following the initial segment having another predetermined duration where the frequency of the excitation signal is kept constant at a third predetermined frequency and varies from a third predetermined amplitude at the beginning of the subsequent segment to a fourth predetermined amplitude at the end of the subsequent segment; and
- the first predetermined frequency, the second predetermined frequency and the third predetermined frequency are established in dependence upon whether the non-linear resonator is a hardening type resonator or a softening type resonator.

Within the embodiments of the invention described within this specification for proof of principles of the ability to tailor the excitation signal to the application and/or nonlinear resonator the sweep of a characteristic of the excitation signal (e.g. frequency, amplitude) is described as being linear. However, it would be evident that other sweep profiles may be employed which are not linear and vary according to a defined function, e.g. exponential change from initial value, step wise linear, etc. Accordingly, a segment may have a frequency function associated with it defining the frequency variation through the segment.

Within the embodiments of the invention described within this specification the excitation signal is described as comprising a signal at a defined frequency which is either varying or is constant. Accordingly, at any instant the excitation signals described and depicted with respect to the proof of principle of embodiments of the invention have a single frequency component. However, it would be evident that within other embodiments of the invention the excitation signal rather than having an amplitude that is varying by a defined function is also amplitude modulated such that the excitation signal in the frequency domain comprises the applied frequency to the resonator with additional components associated with the amplitude modulation, e.g. square wave, sine wave, triangular, pulsed with variable pulse width etc.

Accordingly, the excitation signals described above may be at a predetermined frequency and an amplitude defined by at least one of an overall variation in excitation signal over the duration of a segment and a temporal component representative of the amplitude modulation applied. Accordingly, this may be viewed as having an amplitude function overlaid which comprises the overall variation across the segment overlaid with a modulation that is defined in dependence upon the amplitude modulation transfer function employed and the duration of the segment. Accordingly, a segment may have an amplitude function associated with it defining the amplitude variation through the segment.

Accordingly, considering the initial and subsequent segments then these may be further generalised to:

- the initial segment has a predetermined duration where the excitation signal sweeps from a first predetermined frequency to a second predetermined frequency over the length of the initial segment according to a first frequency function and from a first predetermined amplitude to a second predetermined amplitude over the length of the initial segment according to a first amplitude function;
- the subsequent segment immediately following the initial segment having another predetermined duration where the frequency of the excitation signal is kept constant at a third predetermined frequency and varies from a third predetermined amplitude at the beginning of the subsequent segment to a fourth predetermined amplitude at the end of the subsequent segment according to a second amplitude function;
- the first predetermined frequency, the second predetermined frequency and the third predetermined frequency are established in dependence upon whether the non-linear resonator is a hardening type resonator or a softening type resonator;
- the first frequency function defines the frequency of the excitation signal applied as a function of time through the initial segment;
- the first amplitude function defines the amplitude of the excitation signal applied as a function of time through the initial segment; and
- the second amplitude function defines the amplitude of the excitation signal applied as a function of time through the subsequent segment.

To illustrate the full benefits of this excitation method, five signals have been defined:

- Signal A: designed to show the full benefits of pulse shaping;
- Signal B: designed to show the frequency tuning benefits of pulse shaping;
- Signal C: designed to show the limits of simple wave excitation;
- Signal D: a signal design to show the full benefits of excitation (A);
- Signal E: a signal designed to show the full benefits of excitation (B).

Each excitation signal then needs to be tailored for each specific nonlinear resonator, and for each amplitude of the excitation as the amplitude of the excitation signal has an impact on the behavior in frequency of the resonator. Within the following exemplary descriptions $t_1$=0.5, $t_2$=1.5, and $t_3$=3.0 have been kept constant for all excitation signals although it would be evident that these may be varied within other embodiments of the invention. The characteristics and performance of these excitation signals are presented below in Table 8. It should be noted that the implementation of the excitation signals (A) and (B) should be carefully created as a discontinuity in time in between the phase 2 and phase 3 in such signals will be detrimental to their performance and prevent them from reaching their full potential.

TABLE 8

Characteristics and performance of the different simulated excitation signals

| | Amplitude | $F_1$ | $F_2$ | Displacement |
|---|---|---|---|---|
| (A) | 20 | 480 | 541 | 4.810 |
| (B) | | | 530 | 4.130 |
| (C) | | 507 | | 2.287 |
| (D) | | 541 | | 0.118 |
| (E) | | 530 | | 0.164 |

Accordingly, from Table 8 is evident that excitation (A) yields a displacement equal to 210% compared to the displacement obtained with excitation (C) and 4075% compared to the displacement obtained with the excitation (D). The use of such excitation signal also allows the use of a frequency that is not the resonant frequency while still displaying a greater displacement. This is illustrated as excitation (B) which allows a displacement equal to 180% compared to displacement obtained with excitation (C) and 2518% compared to the displacement obtained with excitation (E).

Figure 15:
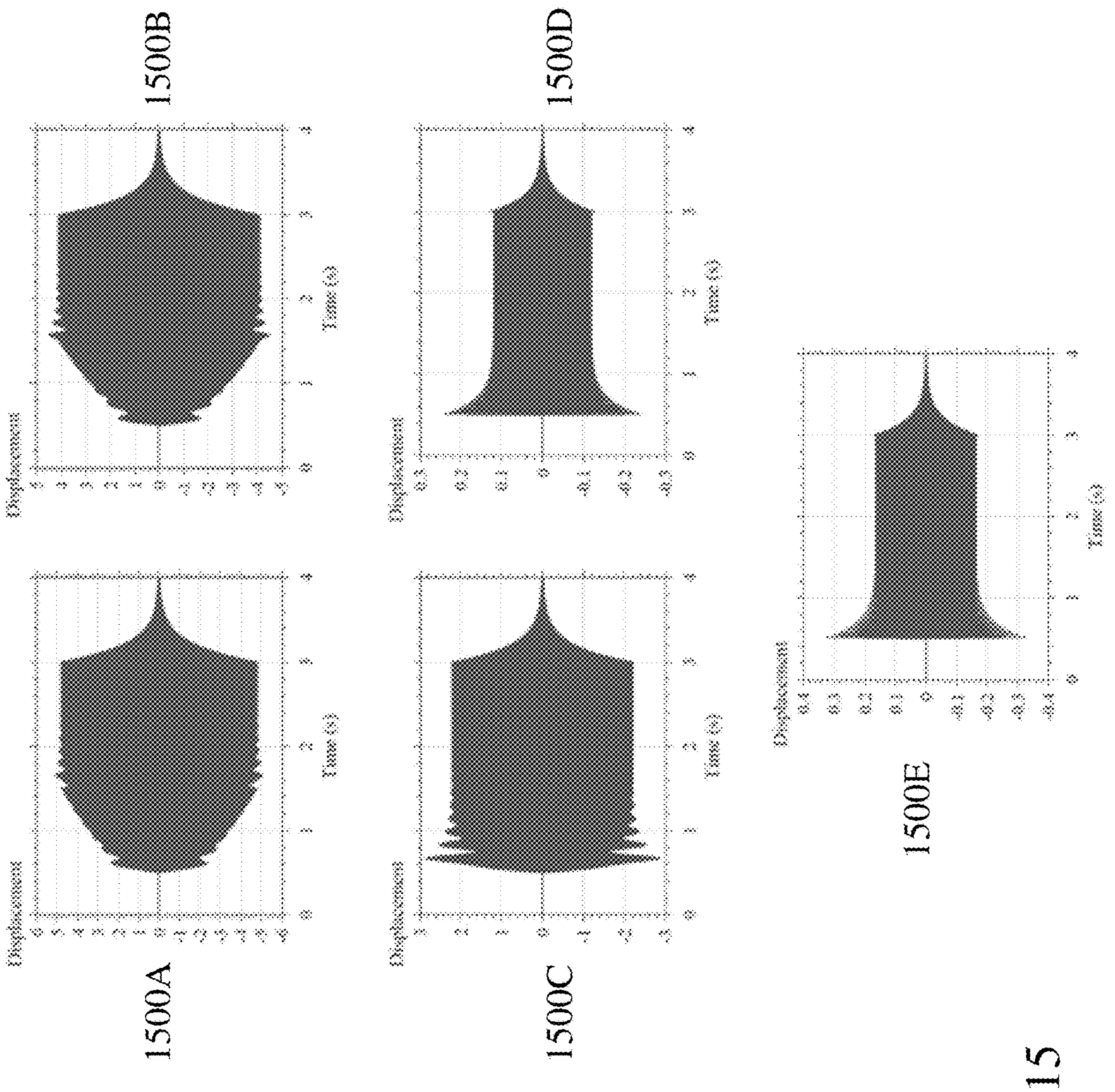
FIG. 15 depicts the impact of type of different exemplary excitation signals established by the inventors on displacement of a SD MEMS resonator.

The impact of each of these excitations on H R is illustrated in FIG. 15 where first to fifth images 1500A to 1500E depict the measured displacement of the resonator proof mass for each of the excitation signals (A) to (E) respectively. In FIG. 15 the gain in displacement is clearly shown when the devices are excited using the excitation signals (A) and (B). However, it is also apparent that the excitations (A) and (B) need some time before reaching the maximum displacement. This time is detrimental to the performances of the PMUT in some applications as it decreases axial resolution. Accordingly, having established increased displacement the inventors next addressed this aspect of the transducer performance.

B2C. Improvement of the Excitation Signal

The inventors established that in order to reduce the time needed before reaching maximum displacement, it is necessary to reduce the difference between the frequencies $F_1$ and $F_2$. This reduction is possible thanks to the unique properties of the behavior in frequency of nonlinear resonators. From such behavior, as illustrated in FIG. 15, it is possible to observe two strong discontinuities. In the of a hardening type resonator, these discontinuities can be observed when the frequency decreases from $f=F_1$ to $f=F_2$, and when the frequency increases from $f=F_3$ to $f=F_4$. The first leads to a strong increase in the displacement when f=A, whilst the second leads to a strong decrease of the displacement of the resonator when f=B.

Accordingly, exploiting this information the inventors established a second excitation signal. This second excitation signal comprising six segments:

Segment 1: between t=0 and $t=t_1$, no excitation is provided;

Segment 2: between $t=t_1$ and $t=t_2$ the excitation is applied and the frequency of excitations is decreased from $f=F_1$ to $f=F_2$;

Segment 3: between $t=t_2$ and $t=t_3$ the frequency of excitations is increased from $f=F_2$ to $f=F_4$;

Segment 4: between $t=t_3$ and $t=t_4$ the frequency of the excitation signal is kept constant at $f=F_3$;

Segment 5: between $t=t_4$ and $t=t_5$ the frequency of excitation signal is increased from $f=F_3$ to $f=F_4$;

Segment 6: between $t=t_5$ and $t=t_6$ where no excitation is provided.

The amplitude of the excitation signal within the exemplary excitation signal presented above is kept constant during the segments 2 to 5. Within other embodiments of the invention the amplitude may be varied with or without commensurate adjustments in the excitation signal frequency(ies).

Figure 16:
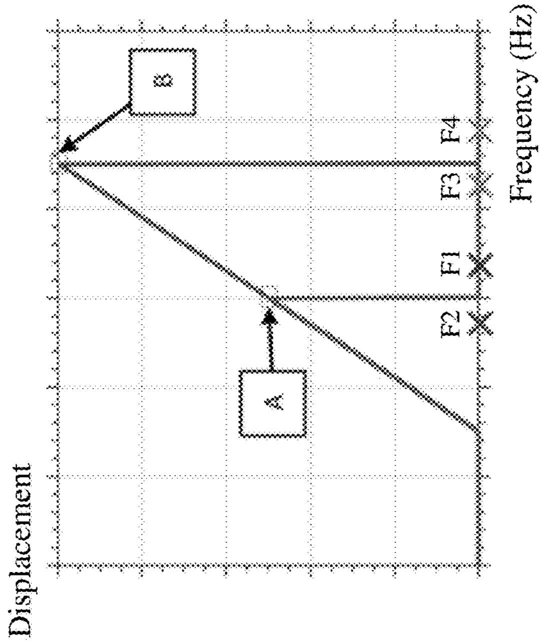
FIG. 16 depicts the simulation of the influence of the direction of the sweep in frequency on the frequency response of a typical hardening type resonator.

With this exemplary signal the maximum displacement should be stable and provided during the fourth segment at $f=F_3$. This process being depicted in FIG. 16. It should be noted that the implementation of the excitation signals (A) and (B) should be carefully created as a discontinuity in time in between one or more of phases 2 and 3, phases 3 and 4, and phases 4 and fifth segment will be detrimental to the performance of the resonators and prevent them from reaching their full potential.

Accordingly, the modified excitation signal can be described as comprising an initial segment (segment 2), a subsequent segment (segment 3), a further segment (segment 4) and another segment (segment 5) wherein:

an initial segment of a predetermined duration and a predetermined amplitude where a frequency of the excitation signal sweeps from a first predetermined frequency to a second predetermined frequency over the initial segment;

a subsequent segment immediately following the initial segment having another predetermined duration and another predetermined amplitude where the frequency of the excitation signal is sweeps from the second predetermined frequency to a third predetermined frequency over the subsequent segment;

a further segment immediately following the subsequent segment having a further predetermined duration and a further predetermined amplitude where the frequency of the excitation signal is kept constant at the third predetermined frequency;

another segment immediately following the further segment having yet another predetermined duration and yet another predetermined amplitude where the frequency of the excitation signal is sweeps from the third predetermined frequency to a fourth predetermined frequency over the subsequent segment; and the first predetermined frequency, the second predetermined frequency, the third predetermined frequency, and the fourth predetermined frequency are established in dependence upon whether the non-linear resonator is a hardening type resonator or a softening type resonator.

Further, the excitation signal can be optionally defined as having a segment immediately prior to the initial segment (segment 1) where no excitation is applied to the non-linear MEMS resonator and a final segment immediately after the another segment (segment 4) where no excitation is applied to the non-linear MEMS resonator.

Further, from the discussions above and below the first predetermined frequency, the second predetermined frequency, the third predetermined frequency, and the fourth predetermined frequency are not the resonant frequency of the non-linear resonator and a the displacement of the proof mass of the non-linear resonator when driven by the excitation signal exceeds that of the non-linear resonator when driven at its resonant frequency.

As noted the amplitude of the excitation signal can vary according to one or more factors including, but not limited to, the characteristics of the nonlinear resonator and the required temporal displacement of the resonator and/or the signal it generates. Accordingly, the excitation signal can be further described as comprising an initial segment (segment 2), a subsequent segment (segment 3), a further segment (segment 4) and another segment (segment 5) wherein:

the initial segment of an initial predetermined duration where the excitation signal sweeps from a first predetermined frequency and first predetermined amplitude to a second predetermined frequency and second predetermined amplitude over the initial segment;

the subsequent segment of a subsequent predetermined duration where the excitation signal sweeps from a third predetermined frequency and third predetermined amplitude to a fourth predetermined frequency and fourth predetermined amplitude over the subsequent segment;

the further segment of a further predetermined duration where the excitation signal sweeps from a fifth predetermined frequency and fifth predetermined amplitude to a sixth predetermined frequency and sixth predetermined amplitude over the further segment;

the another segment of another predetermined duration where the excitation signal sweeps from a seventh predetermined frequency and seventh predetermined amplitude to an eighth predetermined frequency and an eighth predetermined amplitude over the another segment; and the first predetermined frequency, the second predetermined frequency, the third predetermined frequency, the fourth predetermined frequency, the fifth predetermined frequency, the sixth predetermined frequency, the seventh predetermined frequency and the eighth predetermined frequency are established in dependence upon whether the non-linear resonator is a hardening type resonator or a softening type resonator.

Accordingly, when the non-linear MEMS resonator is a hardening type resonator the following conditions can be established for the second excitation signal:

the first predetermined amplitude, the second predetermined amplitude, the third predetermined frequency, the fourth predetermined amplitude, the fifth predetermined amplitude, the sixth predetermined amplitude, the seventh predetermined amplitude and the eighth predetermined amplitude are all equal;

the third predetermined frequency is equal to the second predetermined frequency;

the fifth predetermined frequency, the sixth predetermined frequency, and the seventh predetermined frequency are all equal to the fourth predetermined frequency; and the second predetermined frequency is lower than the first predetermined frequency which itself is lower than the fourth predetermined frequency which itself is lower than the eighth predetermined frequency.

Accordingly, when the non-linear MEMS resonator is a softening type resonator the following conditions can be established for the second excitation signal:

the first predetermined amplitude, the second predetermined amplitude, the third predetermined frequency, the fourth predetermined amplitude, the fifth predetermined amplitude, the sixth predetermined amplitude, the seventh predetermined amplitude and the eighth predetermined amplitude are all equal;

the third predetermined frequency is equal to the second predetermined frequency;

the fifth predetermined frequency, the sixth predetermined frequency, and the seventh predetermined frequency are all equal to the fourth predetermined frequency; and the eighth predetermined frequency is lower than the fourth predetermined frequency which itself is lower than the first predetermined frequency which itself is lower than the second predetermined frequency.

In these instances the excitation signal may further comprise a segment (segment 1) immediately prior to the initial segment (segment 2) where no excitation is applied to the non-linear MEMS resonator and a final segment (segment 6) immediately after the subsequent segment (segment 5) where no excitation is applied to the non-linear MEMS resonator.

Further, the first predetermined frequency, the second predetermined frequency, the third predetermined frequency, the fourth predetermined frequency, the fifth predetermined frequency, the sixth predetermined frequency, the seventh predetermined frequency and the eighth predetermined frequency are not the resonant frequency of the non-linear resonator and a displacement of a proof mass of the non-linear resonator when driven by the excitation signal exceeds that of the non-linear resonator when driven at the resonant frequency.

Within the embodiments of the invention described within this specification for proof of principles of the ability to tailor the excitation signal to the application and/or nonlinear resonator the sweep of a characteristic of the excitation signal (e.g. frequency, amplitude) is described as being linear. However, it would be evident that other sweep profiles may be employed which are not linear and vary according to a defined function, e.g. exponential change from initial value, step wise linear, etc. Accordingly, a segment may have a frequency function associated with it defining the frequency variation through the segment.

Within the embodiments of the invention described within this specification the excitation signal is described as comprising a signal at a defined frequency which is either varying or is constant. Accordingly, at any instant the excitation signals described and depicted with respect to the proof of principle of embodiments of the invention have a single frequency component. However, it would be evident that within other embodiments of the invention the excitation signal rather than having an amplitude that is varying by a defined function is also amplitude modulated such that the excitation signal in the frequency domain comprises the applied frequency to the resonator with additional components associated with the amplitude modulation, e.g. square wave, sine wave, triangular, pulsed with variable pulse width etc.

Accordingly, the excitation signals described above may be at a predetermined frequency and an amplitude defined by at least one of an overall variation in excitation signal over the duration of a segment and a temporal component representative of the amplitude modulation applied. Accordingly, this may be viewed as having an amplitude function overlaid which comprises the overall variation across the segment overlaid with a modulation that is defined in dependence upon the amplitude modulation transfer function employed and the duration of the segment. Accordingly, a segment may have an amplitude function associated with it defining the amplitude variation through the segment.

Accordingly, the second excitation signal may be generalised to:

the initial segment of an initial predetermined duration where the excitation signal sweeps from a first predetermined frequency to a second predetermined frequency over the length of the initial segment according to a first frequency function and from a first predetermined amplitude to a second predetermined amplitude over length of the initial segment according to a first amplitude function;

the subsequent segment of a subsequent predetermined duration where the excitation signal sweeps from a third predetermined frequency to a fourth predetermined frequency over the length of the subsequent segment according to a second frequency function and from a third predetermined amplitude to a fourth predetermined amplitude over the length of the subsequent segment according to a second amplitude function;

the further segment of a further predetermined duration where the excitation signal sweeps from a fifth predetermined frequency to a sixth predetermined frequency over the length of the further segment according to a third frequency function and from fifth predetermined amplitude to a sixth predetermined amplitude over the length of further segment according to a third amplitude function;

the another segment of another predetermined duration where the excitation signal sweeps from a seventh predetermined frequency to an eighth predetermined frequency over the length of the another segment according to a fourth frequency function and from a seventh predetermined amplitude to an eighth predetermined amplitude over the length another segment according to a fourth amplitude function; and the first predetermined frequency, the second predetermined frequency, the third predetermined frequency, the fourth predetermined frequency, the fifth predetermined frequency, the sixth predetermined frequency, the seventh predetermined frequency and the eighth predetermined frequency are established in dependence upon whether the non-linear resonator is a hardening type resonator or a softening type resonator.

In this manner each of the first frequency function, the second frequency function, the third frequency function and the fourth frequency function each define the frequency of the excitation signal applied as a function of time through their respective segments. Further, each of the first amplitude function, the second amplitude function, the third amplitude function and the fourth amplitude function define the amplitude of the excitation signal applied as a function of time through their respective segments.

Accordingly, one or more of the first amplitude function, the second amplitude function, the third amplitude function and the fourth amplitude function are established in dependence upon an amplitude modulation applied to their respective segments and the lengths of their respective segments.

As noted within this specification the second excitation signal allows for the turn-on (rise) and turn-off (decay) of the nonlinear resonator proof mass displacement to be modified. Whilst, within the experiments and discussions within this specification these are presented and considered together it would be evident that within other embodiments of the invention a modified excitation signal may be applied comprising either an initial sequential subset of the segments or a final sequential subset of the segments.

Figure 17:
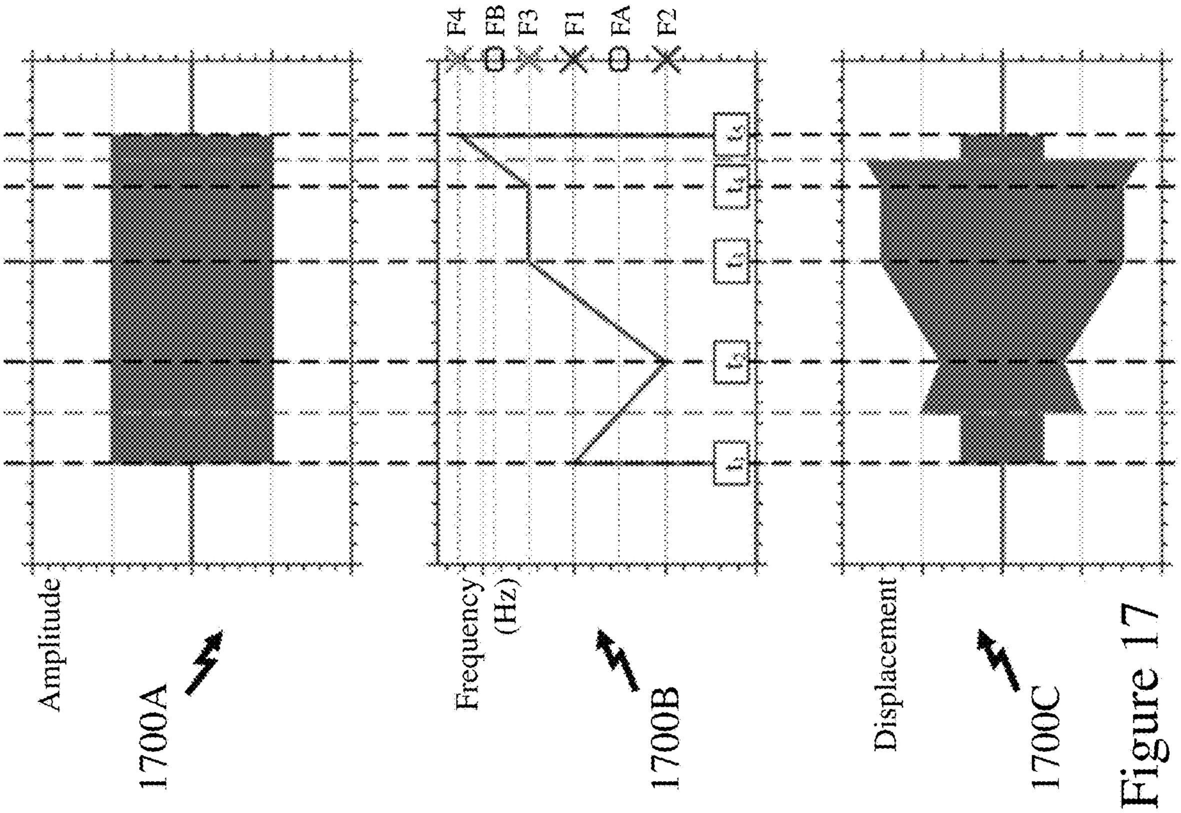
FIG. 17 depicts the simulation of the theoretical behavior of a MEMS non-linear resonator device excited using a Pulse Shaping signal according to an embodiment of the invention.

Accordingly, the excitation signal may be considered to be a first sequential subset of a sequential series of segments beginning with an initial segment of the sequential series of segments or a second sequential subset of the sequential series segments ending with another segment of the sequential series of segments where the sequential series of segments comprises the initial segment, a subsequent segment following the initial segment, a further segment following the subsequent segment, and the another segment following the further segment. The initial segment, subsequent segment FIG. 17 depicts the expected behavior of the MEMS is presented where first to third images 1700A to 1700C respectively depict the amplitude of the excitation signal applied to the PMUT transducer, frequency of the applied excitation signal to the PMUT transducer and the resulting displacement versus time for the PMUT transducer respectively. The discontinuities in amplitude of the displacement of the MEMS can be seen at $t=t_A$ when $f=F_A$ and $t=t_B$ when $f=F_B$. The exploitation of the first discontinuity allows a strong increase of the displacement of the MEMS, whilst the second discontinuity provides for a strong decrease of the displacement of the MEMS. This second discontinuity is employed to control the decay of the resonator.

The validation of the performance of the exemplary excitation signal according to an embodiment of the invention was verified experimentally. It should be noted that while this demonstration has been made using a nonlinear resonator with a hardening response, it is possible to do a similar exercise with nonlinear resonator with a softening response. In such case the relationship between the excited frequencies is slightly different to take advantage of both discontinuity in the behavior in frequency of softening type resonators. As with the case of a hardening type resonator, the relationship between $F_1$, $F_2$, $F_3$, $F_4$, $F_A$ and $F_B$ is given by Equation (13). In the instance of a softening type resonator, this relationship becomes that given by Equation (14).

$$F_2 < F_A < F_1 < F_3 < F_B < F_4 \tag{13}$$

$$F_4 < F_A < F_3 < F_1 < F_B < F_2 \tag{14}$$

In both cases the maximum displacement will be stable and is provided during phase 4 at $f=F_3$. The mechanism for the generation of Pulse Shaping whilst presented from the theoretical viewpoint and numerical simulation for hardening nonlinear resonators can be applied equally to softening type resonator.

The Pulse Shaping behavior is enabled though the unique properties of the frequency response of nonlinear resonators. In contrast to the prior art where only the resonant frequency is established and the resonator driven the characterisation of the resonator to exploit Pulse Shaping must be either extensively characterized and/or modelled before it can be used for Pulse Shaping.

B3. Experimental Validation

B3A. Fabrication

Figure 7:
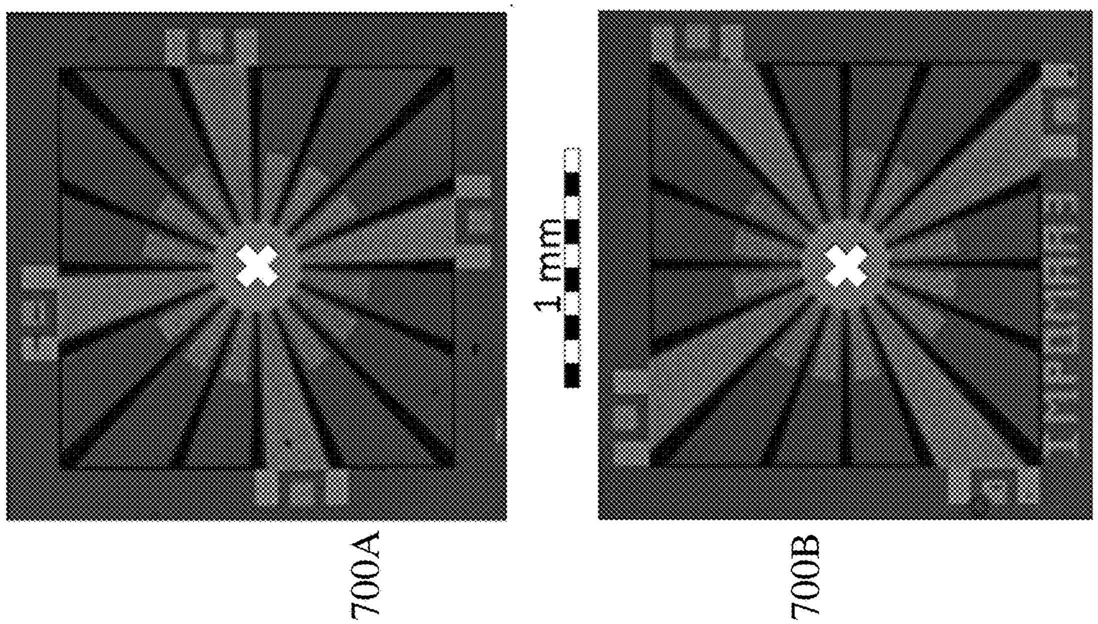
FIG. 7 depicts optical micrographs of the fabricated SD MEMS resonator device variants with spring hardening and spring softening.

To experimentally validate the potential of Pulse Shaping to improve the performances of PMUTS, two nonlinear MEMS resonators were designed and fabricated. As presented above these are based on the Squared Daisy structure which provides the ability to leverage both types of nonlinearity (softening and hardening) depending on the particular anchoring scheme employed as depicted in FIGS. 5 and 7. This property is especially of interest in this case as it allows the demonstration of Pulse Shaping for both softening and hardening type nonlinear MEMS resonators with high degree of commonality in the mechanical geometry of the resonators.

Figure 18:
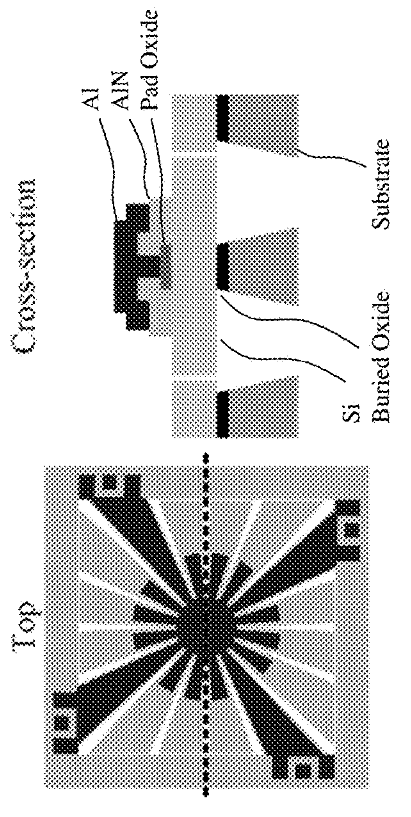
FIG. 18 depicts plan and cross section views of the fabricated SD MEMS resonators employed within experiments to demonstrate the Pulse Shaping methodology according to embodiments of the invention.

As outlined above the SD resonators employed occupied a die are of 1700 μm by 1700 μm with a circular 500 μm proof mass employing a design with 16 cantilevers of which 4 in each design variant are anchored where selection of which cantilevers are anchored defines whether the resonator is one exhibiting a softening type response or a hardening type response. The overall geometry of the resonators was the same as they were concurrently fabricated on the commercial MEMSCAP foundry with a resonator membrane formed from a 10 μm thick silicon layer. This layer also acts as the bottom electrode as it has been doped. The piezoelectric material was a 0.5 μm layer of aluminum nitride (AlN) which allows for the generation of the movement to displace the membrane. The top electrode was made via a stacked combination of 20 nm thick chromium (Cr) and 1 μm thick aluminum (Al). Isolation between the two electrodes was provided either by the AlN layer or by a 0.2 μm thick layer of silicon dioxide (SiO2). Upon reception of the device from the foundry, no post-processing step was applied to the devices. FIG. 18 depicts plan and cross-sectional views of the MEMS structure. The variant shown being Variant 2 as described above, i.e. a softening type nonlinear MEMS transducer. Optical micrographs of the softening type and hardening type nonlinear MEMS resonators being depicted in first and second images 700A and 700*b* respectively of FIG. 7.

B3B. Description of the Experimental Test Setup

Characterisation of the MEMS resonators under the different excitation signals was conducted with the experimental configuration described above with respect to and depicted in FIG. 8. The sampling frequency of the measurements performed with the vibrometer was again set to 2.56 MHz. This frequency has been chosen to provide an oversampling of the signal (as the operating frequency of the device is below 10 kHz) and allow precise observation of the displacement of the measurement point shown in FIG. 7.

B3C Characterization of the Devices

As described above in order to exploit the full capability of Pulse Shaping, proper characterization of the devices needs to be conducted. The resonant frequency of the resonators fabricated were characterized using the test setup presented in FIG. 8. This characterization being made using a pulsed sweep (PS) method in which the order of the excited frequency does not influence the results, but also continuous sweeps in both the forward (CSF) and backward (CSB) modes. This characterization being made for A equal to 10 V and 20 V. These results are summarized in Table 9. The impact of the amplitude of the excitation signal on the resonant frequency is highlighted by the presence of the line entitled Resonant Frequency (Hz). This variation validates the first tuning mechanism used in Pulse Shaping, namely the amplitude of the excitation signal which has a direct impact on the resonant frequency.

TABLE 9

Summary of the characteristics of both resonators

| | Excitation Voltage | STR | | | HTR | | |
|---|---|---|---|---|---|---|---|
| | (V) | PS | CSF | CSB | PS | CSF | CSB |
| Resonant Frequency (Hz) | 10 | 3970 | 3969 | 3854 | 7800 | 7812 | 7797 |
| | 20 | 3920 | 3918 | 3638 | 7910 | 8058 | 7879 |
| Δ Resonant Frequency (Hz) | — | −50 | −51 | −216 | 110 | 246 | 82 |

Figure 19:
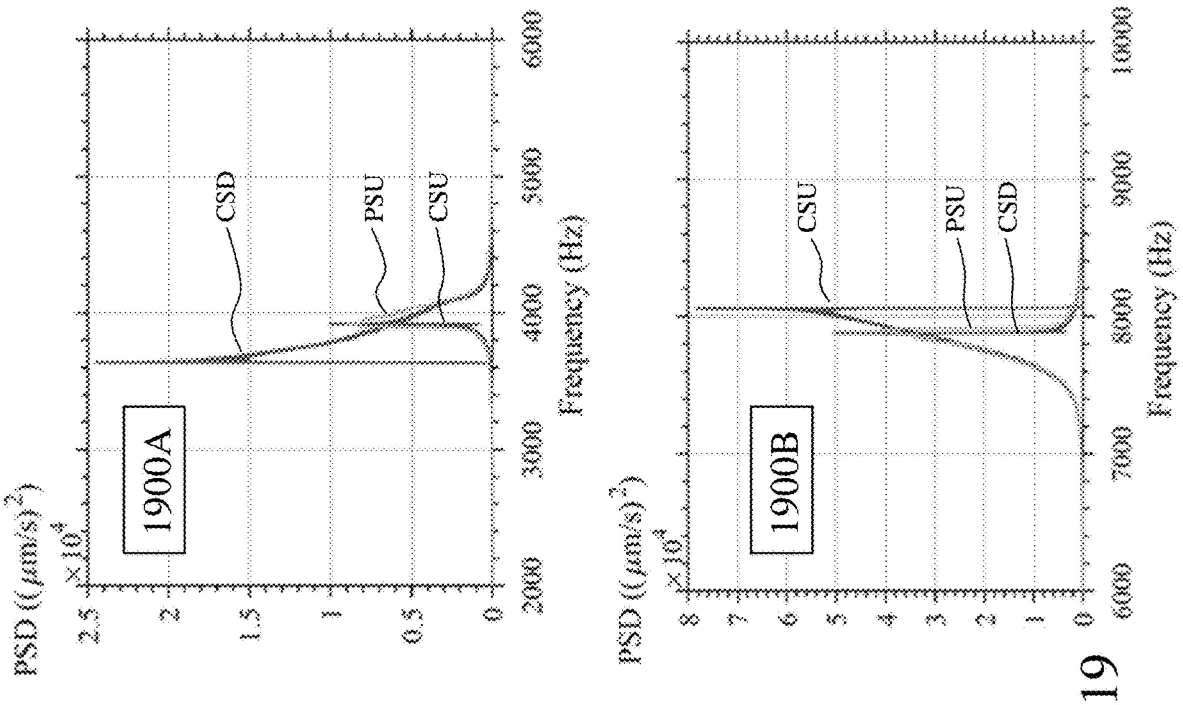
FIG. 19 depicts the influence of the direction of the frequency sweep on the frequency response of softening type resonators (STRs) and hardening type resonators (HTRs) respectively.

As explained and simulated above the impact of the measurement method used to identify the resonant frequency of the device, and the impact of the amplitude of the excitation signal can be observed. This first result allows the validation of the first frequency tuning mechanism as changing the amplitude of the excitation signal results in a variation of the resonant frequency, as for the softening type resonator (STR) augmenting the amplitude of the excitation signal reduces the resonant frequency (κ<0) while it augments for the hardening type resonator (HTR) (κ>0). Graphical visualization of these results are shown in first image 1900A in FIG. 19 for the STR resonators and in second image 1900B in FIG. 8B for the HTR resonators, in the form the power density of the signal when the device is excited with different sweep directions.

It should be noted that, while for this demonstration, the frequencies A and B have been determined experimentally, it is possible to determine them analytically.

B3D. Description of the Excitation Signals

The excitation signal has been devised following the sequence presented above. As noted in section Ill-C Similarly, to illustrate the full benefits of this excitation method, five excitation signals have been defined:

Signal A: designed to show the full benefits of pulse shaping;

Signal B: designed to show the frequency tuning benefits of pulse shaping;

Signal C: designed to show the limits of simple wave excitation;

Signal D: a signal design to show the full benefits of excitation (A);

Signal E: a signal designed to show the full benefits of excitation (B).

Such excitation signal then needs to be tailored for each nonlinear resonator, and for each amplitude of the excitation as the amplitude of the excitation signal has an impact on the behavior in frequency of the resonator. The description of each excitation signal is presented in Table 10. For these excitation signals the parameters $T_1$ to $T_6$ have not been kept constant, but the rate at which the excited frequency varies has. This rate has been defined as 1 kHz $s^{-1}$. Within other embodiments of the invention the rate at which the excited frequency varies may be varied between different segments of a signal and within a segment of a signal.

TABLE 10

Characteristics and performance of the different experimental excitation signal

| Variant | Type Signal | $F_1$ (Hz) | $F_2$ (Hz) | $F_3$ (Hz) | $F_4$ (Hz) | Velocity ($ms^{-1}$) |
|---|---|---|---|---|---|---|
| STR | (A) | 3910 | 3920 | 3640 | 3630 | 0.2712 |
| | (B) | | | 3800 | | 0.1954 |
| | (C) | | 3920 | | | 0.1417 |
| | (D) | | 3640 | | | 0.0299 |
| | (E) | | 3800 | | | 0.0489 |
| HTR | (A) | 3910 | 3920 | 3640 | 3630 | 0.3313 |
| | (B) | | | 3800 | | 0.3013 |
| | (C) | | 3920 | | | 0.0950 |
| | (D) | | 3640 | | | 0.0698 |
| | (E) | | 3800 | | | 0.0880 |

B3E. Experimental Results

Figure 20:
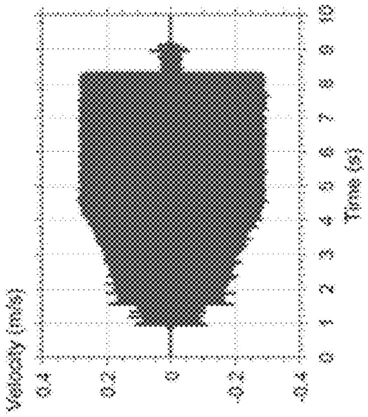
FIG. 20 depicts the impact of type of excitation on the STR SD MEMS resonators excited using Pulse Shaping signals according to an embodiment of the invention relative to the prior art excitation signal.
Figure 20:
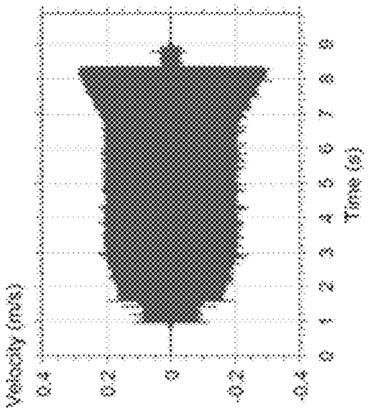
Figure 20:
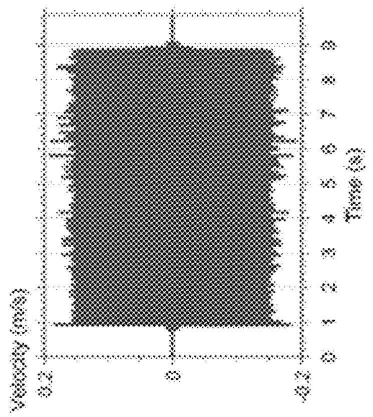
Figure 20:
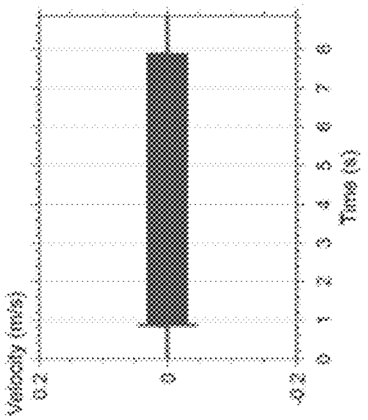
Figure 20:
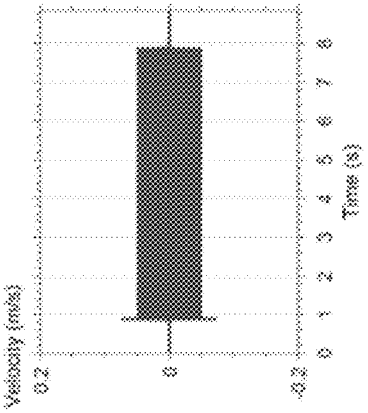
Figure 21:
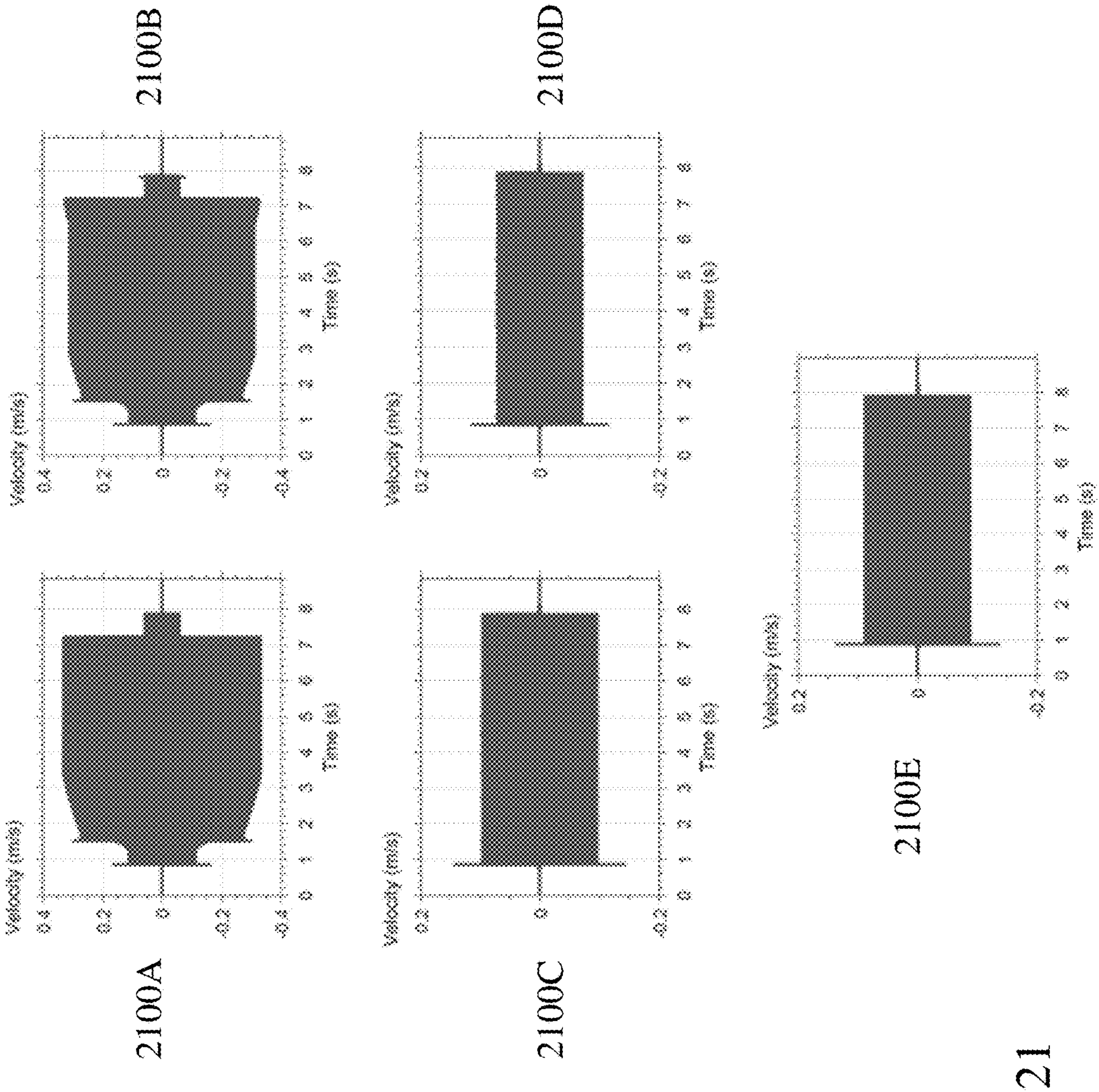
FIG. 21 depicts the impact of type of excitation on the HTR SD MEMS resonators excited using Pulse Shaping signals according to an embodiment of the invention relative to the prior art excitation signal.

The impact of each of these excitation signal types on the HTR and STR devices is illustrated in FIGS. 20 and 21 respectively. The envelope of the displacement of the resonators is in agreement to the predicted behavior shown in FIG. 17. In FIG. 20 first to fifth graphs 2000A to 2000B depict the measured velocity of the HTR resonator membrane for the excitation signals (A) to (E) respectively. In FIG. 21 first to fifth graphs 2100A to 2100B depict the measured velocity of the STR resonator membrane for the excitation signals (A) to (E) respectively.

This being particularly evident in the case of the (B) excitation signal, as presented in second images 2000B and 2100B in FIGS. 20 and 21 for the STR resonator and HTR resonator respectively. This is also the case when the frequency of the excitation signal stays constant as illustrated in third to fifth images 2000C to 2000E in FIG. 20 and third to fifth images 2100C to 2100E in FIG. 21 which are in agreement to the predicted behavior as shown in third to fifth images 1500C to 1500E in FIG. 15.

The added value of Pulse Shaping is clearly highlighted. The excitation signal (A) allows establishes a velocity of the membrane equal to 191% and 348% of that obtained with the excitation signal (C) and an augmentation of 907% and 474% compared to that obtained for the corresponding excitation signal (D) for the STR and HTR devices respectfully.

The ability to use nonlinear resonator outside of their resonant frequency is also clearly highlighted. As the excitation signal (B) allows a velocity of the membrane equal to 138% and 325% compared to the displacement obtained with excitation signal (C) and an augmentation of 400% and 351% compared to that obtained with the corresponding excitation signal (E) for STR and HTR respectfully.

Accordingly, the mechanism for the generation of Pulse Shaping has been experimentally validated for both hardening and softening type nonlinear resonators. In both cases, the behavior was in agreement with the predictions formulated and presented above. Therefore, the use of Pulse Shaping allows the tuning of the resonant frequency of the resonator, an augmentation of the maximal velocity reached by the resonator and the use of the resonator outside of its resonant frequency while still providing a greater velocity than the traditional excitation.

Within the embodiments described above the amplitude of the excitation signal within all segments has been described as being constant.

It would be evident to one of skill in the art that the amplitude of the excitation may be kept constant within a particular segment but that the amplitude between different segments may be different and that the frequency or frequencies with the different segments may therefore change according to the amplitude within each specific segment. Accordingly, for example where the description of exemplary embodiments above describes a segment comprising a fixed frequency immediately after a previous segment ending with the fixed frequency then if the amplitude of the segment is different from the previous segment the fixed frequency of the segment may be different from the ending frequency of the previous segment.

It would be evident to one of skill in the art that the amplitude of the excitation may vary within a particular segment or particular segments and that the frequency or frequencies with these segments may therefore change according to the amplitude within each specific segment. Accordingly, for example where the description of exemplary embodiments above describes a segment comprising a fixed frequency and amplitude if the amplitude now varies then the frequency of the excitation may also vary within the segment from an initial value to a final value. Accordingly, the excitation signal in this segment may be considered as having a nominal frequency and nominal amplitude but the actual frequency of the excitation signal applied is established in dependence upon the nominal frequency and an offset determined in dependence upon the offset of the actual amplitude from the nominal amplitude.

It would be evident to one of skill in the art that the excitation signals may be implemented to provide a controlled "turn on" to maximum displacement as well as to provide a controlled "turn off."

It would be evident to one of skill in the art that the excitation signals may be implemented to provide a chirped output acoustic signal.

B3F: Summary

Within the preceding section the experimental results demonstrated the benefits of Pulse Shaping. However, these excitation signal schemes according to embodiments of the invention also allow for other improvements in the performance of MEMS Ats and UTs.

For example, another benefit of Pulse Shaping is the ability to control the decay time of the resonator. This is enabled by the use of sharp discontinuities in the frequency response of the nonlinear devices and is shown in the creation of the signal for segment 5. The impact of such a segment in FIG. 22. However, when designing such a phase the length of this phase will have a strong impact on the benefits received. As such if the duration of this excitation is too long, rebounds will appear in the amplitude of the displacement of the MEMS as evident within first image 2200A in FIG. 22 where these rebounds are evident in the controlled relaxation resonator response. The inventors have similarly established these rebounds within simulations of the HTR.

Simulations using the $H_R$ resonator were performed to verify the impact of the duration of the fifth segment of the excitation signal on the decay time of the resonator. This time has been named time of constant decay $T_{CD}$ and has been defined as the time needed to reduce the amplitude of the displacement by 50%. Under no excitation $T_{CD}$ has been simulated at 148.8 ms. However, simulations have shown that if the duration of the fifth segment was equal to 20 ms then $F_{CD}$ was reduced to 123.5 ms, which represents a reduction of $T_{CD}$ of 17%. This case being illustrated in second image 2200B in FIG. 22. In which it is clear that the controlled decay is faster than the normal decay of the resonator.

Figure 22:
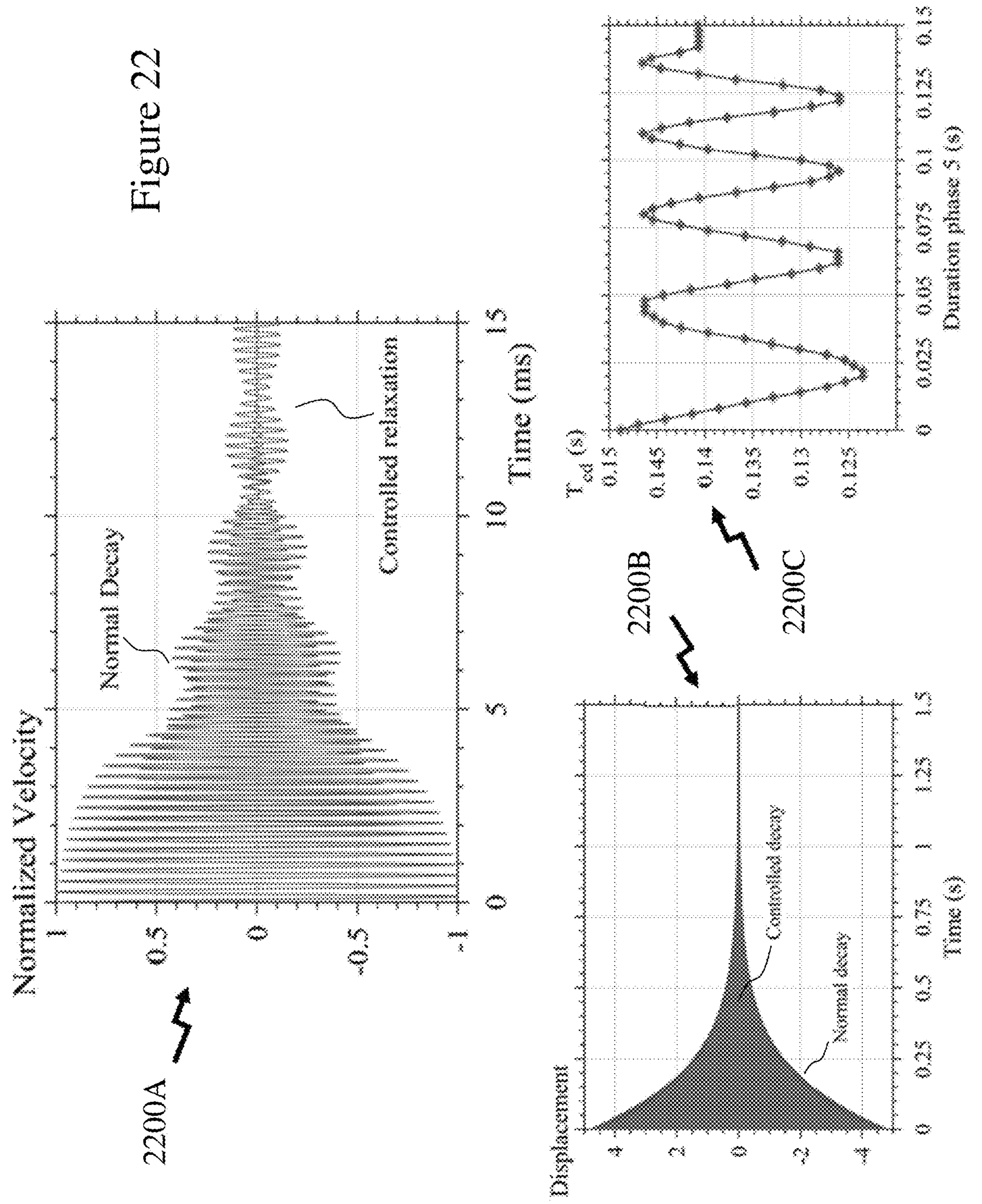
FIG. 22 depicts the impact of the excitation method on the decay of the device for excitation signals according to embodiment as a function of the duration of the fifth segment of the excitation signal relative to the prior art excitation signal.

The effect of the variation of the duration of the fifth segment on the value of $T_{CD}$ is evident in third image 2200C in FIG. 22. This clearly highlights the benefits of Pulse Shaping as a way to control the value of $T_{CD}$, as use of the fifth segment duration yields a reduction of $T_{CD}$ in all cases. The value of $T_{CD}$ under normal decay which is denoted when the duration of the fifth segment is equal to 0 and is greater than all the other values obtained when varying the duration of the fifth segment.

It should be noted that the duration of the fifth segment should be carefully controlled to show maximum benefits and that if the duration of this phase is greater than the original value $T_{CD}$, then the value of $T_{CD}$ is constant and in the case of $H_R$ is equal to 140.7 ms, which represents a reduction of $T_{CD}$ of 5.4%. A longer duration for the fifth segment is not recommended as then rebounds will happen as shown experimentally in first image 2200A in FIG. 22.

For a more practical application, the results presented in FIGS. 21 and 22 are not yet comparable to a typical pulsed wave excitation as the duration of the pulse is too long (i.e. about 8 s). However, it is possible to compress these signals in the time domain by increasing the rate at which the frequency varies in the second and fifth segments of the excitation signal. Moreover, these results are perfectly comparable to the continuous wave excitation as once the maximum displacement it reached this state is stable, and therefore paves the way toward the use of nonlinear resonators for the emission of ultrasonic signals.

As stated above this excitation signal scheme is novel relative to the prior art. However, several techniques have been reporting aiming to improve the performance of UTs. These include methods on how to limit the effects of process variation on the resonant frequency of UTs, and as such a passive frequency tuning method was employed, see for example Robichaud et al. "Frequency Tuning Technique of Piezoelectric Ultrasonic Transducers for Ranging Applications," (J. Microelectromechanical Systems, vol. 27, no. 3, pp. 570-579) (Robichaud1) and Robichaud et al. "A Novel Topology for Process Variation-Tolerant Piezoelectric Micromachined Ultrasonic Transducers," (J. Microelectromechanical Systems, vol. 27, no. 6, pp. 1204-1212 December 2018) (Robichaud2). Alternatively, Kusano et al. in "Wideband air-coupled PZT piezoelectric micromachined ultrasonic transducer through DC bias tuning," (IEEE 30th Int. Conf. Micro Electro Mechanical Systems (MEMS), January 2017, pp. 1204-1207) presents the use of a biasing signal to exploit two resonant modes with closely spaced natural frequencies near 175 kHz, which also allows a relative control of the decay time of their resonator. In contrast, Nastro et al. in "Piezoelectric Micromachined Acoustic Transducer with Electrically-Tunable Resonant Frequency" (20th Int. Conf. Solid-State Sensors, Actuators and Microsystems. June 2019, pp. 1905-1908) exploits a DC bias voltage in the piezoelectric layer to produce a controllable stress, which in turn allows relative control of the resonant frequency of the ultrasonic transducer.

Others such as Chen et al. in "Transmitting Sensitivity Enhancement of Piezoelectric Micromachined Ultrasonic Transducers via Residual Stress Localization by Stiffness Modification" (IEEE Electron Device Letters, vol. 40, no. 5, pp. 796-799, May 2019) and Guldiken et al. "Characterization of dual-electrode CMUTs: demonstration of improved receive performance and pulse echo operation with dynamic membrane shaping" (IEEE Trans Ultrasonics, Ferroelectrics, and Frequency Control, vol. 55, no. 10, pp. 2336-2344 October 2008) present layout methods for improved displacement of the membrane of the UTs. Finally Robichaud et al. in "Electromechanical Tuning of Piecewise Stiffness and Damping for Long-Range and High-Precision Piezoelectric Ultrasonic Transducers" (J. Microelectromechanic al Systems, pp. 1-10, 2020) (Robichaud3) presents the use of an actuator to reduce and control the decay time of the resonator by using electrostatically activated dampers.

These results are compiled and compared with this work in the Table 11. While it should be possible to combine the results from these works into a single device, to the best knowledge of the authors no such device has been proposed in the literature. While, on the other hand, Pulse Shaping allows the use of any existing nonlinear resonator to obtain such results. Furthermore it should be noted that Pulse Shaping allows the use of the resonators outside of their resonant frequency while still obtaining higher velocity than the traditional excitation methods. Such a benefit is unavailable using any other method presented in the literature. Accordingly, the inventive excitation control signal protocols and schemes according to embodiments of the invention provide a simple means of implementing frequency tuning, velocity augmentation, decay time control and off-resonant use for a variety of HTR and STR resonator designs.

TABLE 11

Comparison with the literature

| Author | Mechanism | Frequency Tuning | Velocity Augmentation | Decay Time Control | Non-Resonant Resonator Use |
|---|---|---|---|---|---|
| Kusano | DC Bias | Yes (active) | No | Yes | No |
| Robichaud(1) | Processing | Yes (passive) | No | No | No |
| Robichaud(2) | Layout | Yes (passive) | No | No | No |
| Chen | Layout | No | Yes (203%) | No | No |
| Nastro | DC Bias | Yes (active) | No | No | No |
| Guldiken | Layout | No | Yes (300%) | No | No |
| Robichaud(3) | Actuator | Yes (active) | No | Yes | No |
| This Invention | Excitation Signal | Yes (active) | Yes (348%) | Yes | Yes |

Whilst the inventors demonstrated the inventive excitation signal schemes using a function generator it would be evident that within practical applications the use of a voltage-controlled oscillator (VCO) would allow a low cost solution to the creation of the excitation signals. However, it should be noted that most common off-the-shelf VCO have a square output and accordingly, it may be beneficial to employ a Digital-to-Analog Converter (DAC) to generate the required excitation signals. Compared to a VCO the use of a DAC also allows a shorter turn-on time and the generation of any excitation signal. However, a high-speed DAC should be employed to allow proper generation of the excitation signal without high harmonic distortion.

The inventors within the exemplary excitation signals presented employed a constant signal amplitude. However, the excitation signal may employ amplitude modulation either between segments or within segments in the generation of excitation signals according to embodiments of the invention. This would allow for improvement of the control of the turn-on and turn-off time of the devices, albeit with the tradeoff of increasing the complexify of excitation signal as changing the amplitude of the excitation signal also changes the frequency response of the non-linear MEMS resonators as described above.

As outlined above the embodiments of the invention whilst presented with respect to PMUTs can be applied to PMATs, CMUTs and CMATs. Further, whilst the embodiments of the invention have been described and depicted with respect to SD type MEMS resonators the methodologies and processes described with respect to embodiments of the invention can be applied to other nonlinear MEMS resonators of either the hardening type or softening type without departing from the scope of the invention.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of driving a non-linear acoustic resonator comprising:

providing a control circuit for controlling the non-linear resonator wherein the control circuit generates an excitation signal in dependence upon a target output from the non-linear resonator and established characteristics of the non-linear resonator; and applying the excitation signal to the non-linear resonator; wherein the excitation signal comprises:

an initial segment of a predetermined duration where the excitation signal sweeps from a first predetermined frequency to a second predetermined frequency over the length of the initial segment according to a first frequency function and from a first predetermined amplitude to a second predetermined amplitude over the length of the initial segment according to a first amplitude function;

a subsequent segment immediately following the initial segment having another predetermined duration where the frequency of the excitation signal is kept constant at a third predetermined frequency and varies from a third predetermined amplitude at the beginning of the subsequent segment to a fourth predetermined amplitude at the end of the subsequent segment according to a second amplitude function; wherein the first frequency function defines the frequency of the excitation signal applied as a function of time through the initial segment;

the first amplitude function defines the amplitude of the excitation signal applied as a function of time through the initial segment;

the second amplitude function defines the amplitude of the excitation signal applied as a function of time through the subsequent segment; and the first predetermined frequency, the second predetermined frequency and the third predetermined frequency are established in dependence upon whether the non-linear resonator is a hardening type resonator or a softening type resonator.

2. The method according to claim 1, wherein at least one of:

the excitation signal further comprises a segment immediately prior to the initial segment where no excitation is applied to the non-linear resonator and a final segment immediately after the subsequent segment where no excitation is applied to the non-linear resonator; and the first predetermined frequency, the second predetermined frequency and the third predetermined frequency are not the resonant frequency of the non-linear resonator and a displacement of a proof mass of the non-linear resonator when driven by the excitation signal exceeds that of the non-linear resonator when driven at the resonant frequency.

3. A method of driving a non-linear acoustic resonator comprising:

providing a control circuit for controlling the non-linear resonator wherein the control circuit generates an excitation signal in dependence upon a target output from the non-linear resonator and established characteristics of the non-linear resonator; and applying the excitation signal to the non-linear resonator; wherein the excitation signal comprises:

an initial segment of a predetermined duration and a predetermined amplitude where a frequency of the excitation signal sweeps from a first predetermined frequency to a second predetermined frequency over the initial segment;

a subsequent segment immediately following the initial segment having another predetermined duration and another predetermined amplitude where the frequency of the excitation signal is sweeps from the second predetermined frequency to a third predetermined frequency over the subsequent segment;

a further segment immediately following the subsequent segment having a further predetermined duration and a further predetermined amplitude where the frequency of the excitation signal is kept constant at the third predetermined frequency; and another segment immediately following the further segment having yet another predetermined duration and yet another predetermined amplitude where the frequency of the excitation signal is sweeps from the third predetermined frequency to a fourth predetermined frequency over the subsequent segment; and the first predetermined frequency, the second predetermined frequency, the third predetermined frequency, and the fourth predetermined frequency are established in dependence upon whether the non-linear resonator is a hardening type resonator or a softening type resonator.

4. The method according to claim 3, wherein at least one of:

the excitation signal further comprises a segment immediately prior to the initial segment where no excitation is applied to the non-linear resonator and a final segment immediately after the subsequent segment where no excitation is applied to the non-linear resonator; and the first predetermined frequency, the second predetermined frequency, the third predetermined frequency, and the fourth predetermined frequency are not the resonant frequency of the non-linear resonator and a displacement of a proof mass of the non-linear resonator when driven by the excitation signal exceeds that of the non-linear resonator when driven at the resonant frequency.

5. A method of driving a non-linear acoustic resonator comprising:

providing a control circuit for controlling the non-linear resonator wherein the control circuit generates an excitation signal in dependence upon a target output from the non-linear resonator and established characteristics of the non-linear resonator; and applying the excitation signal to the non-linear resonator; wherein the excitation signal comprises:

an initial segment of an initial predetermined duration where the excitation signal sweeps from a first predetermined frequency and first predetermined amplitude to a second predetermined frequency and second predetermined amplitude over the initial segment;

a subsequent segment of a subsequent predetermined duration where the excitation signal sweeps from a third predetermined frequency and third predetermined amplitude to a fourth predetermined frequency and fourth predetermined amplitude over the subsequent segment;

a further segment of a further predetermined duration where the excitation signal sweeps from a fifth predetermined frequency and fifth predetermined amplitude to a sixth predetermined frequency and sixth predetermined amplitude over the further segment;

another segment of another predetermined duration where the excitation signal sweeps from a seventh predetermined frequency and seventh predetermined amplitude to an eighth predetermined frequency and an eighth predetermined amplitude over the another segment;

the first predetermined frequency, the second predetermined frequency, the third predetermined frequency, the fourth predetermined frequency, the fifth predetermined frequency, the sixth predetermined frequency, the seventh predetermined frequency and the eighth predetermined frequency are established in dependence upon whether the non-linear resonator is a hardening type resonator or a softening type resonator.

6. The method according to claim 5, wherein in the further segment the fifth predetermined frequency and the sixth predetermined frequency are the same; and in the further segment the fifth predetermined amplitude and the sixth predetermined amplitude are the same.

7. The method according to claim 5, wherein the non-linear resonator is a hardening type resonator;

the first predetermined amplitude, the second predetermined amplitude, the third predetermined frequency, the fourth predetermined amplitude, the fifth predetermined amplitude, the sixth predetermined amplitude, the seventh predetermined amplitude and the eighth predetermined amplitude are all equal;

the third predetermined frequency is equal to the second predetermined frequency;

the fifth predetermined frequency, the sixth predetermined frequency, and the seventh predetermined frequency are all equal to the fourth predetermined frequency; and the second predetermined frequency is lower than the first predetermined frequency which itself is lower than the fourth predetermined frequency which itself is lower than the eighth predetermined frequency.

8. The method according to claim 5, wherein the non-linear resonator is a softening type resonator;

the first predetermined amplitude, the second predetermined amplitude, the third predetermined frequency, the fourth predetermined amplitude, the fifth predetermined amplitude, the sixth predetermined amplitude, the seventh predetermined amplitude and the eighth predetermined amplitude are all equal;

the third predetermined frequency is equal to the second predetermined frequency;

the fifth predetermined frequency, the sixth predetermined frequency, and the seventh predetermined frequency are all equal to the fourth predetermined frequency; and the eighth predetermined frequency is lower than the fourth predetermined frequency which itself is lower than the first predetermined frequency which itself is lower than the second predetermined frequency.

9. The method according to claim 5, wherein at least one of:

the excitation signal further comprises a segment immediately prior to the initial segment where no excitation is applied to the non-linear resonator and a final segment immediately after the subsequent segment where no excitation is applied to the non-linear resonator; and the first predetermined frequency, the second predetermined frequency, the third predetermined frequency, the fourth predetermined frequency, the fifth predetermined frequency, the sixth predetermined frequency, the seventh predetermined frequency and the eighth predetermined frequency are not the resonant frequency of the non-linear resonator and a displacement of a proof mass of the non-linear resonator when driven by the excitation signal exceeds that of the non-linear resonator when driven at the resonant frequency.

10. A method of driving a non-linear acoustic resonator comprising:

providing a control circuit for controlling the non-linear resonator wherein the control circuit generates an excitation signal in dependence upon a target output from the non-linear resonator and established characteristics of the non-linear resonator; and applying the excitation signal to the non-linear resonator; wherein the excitation signal comprises:

an initial segment of an initial predetermined duration where the excitation signal sweeps from a first predetermined frequency to a second predetermined frequency over the length of the initial segment according to a first frequency function and from a first predetermined amplitude to a second predetermined amplitude over length of the initial segment according to a first amplitude function;

a subsequent segment of a subsequent predetermined duration where the excitation signal sweeps from a third predetermined frequency to a fourth predetermined frequency over the length of the subsequent segment according to a second frequency function and from a third predetermined amplitude to a fourth predetermined amplitude over the length of the subsequent segment according to a second amplitude function;

a further segment of a further predetermined duration where the excitation signal sweeps from a fifth predetermined frequency to a sixth predetermined frequency over the length of the further segment according to a third frequency function and from fifth predetermined amplitude to a sixth predetermined amplitude over the length of further segment according to a third amplitude function; and another segment of another predetermined duration where the excitation signal sweeps from a seventh predetermined frequency to an eighth predetermined frequency over the length of the another segment according to a fourth frequency function and from a seventh predetermined amplitude to an eighth predetermined amplitude over the length another segment according to a fourth amplitude function; and the first predetermined frequency, the second predetermined frequency, the third predetermined frequency, the fourth predetermined frequency, the fifth predetermined frequency, the sixth predetermined frequency, the seventh predetermined frequency and the eighth predetermined frequency are established in dependence upon whether the non-linear resonator is a hardening type resonator or a softening type resonator.

11. The method according to claim 10, wherein each of the first frequency function, the second frequency function, the third frequency function and the fourth frequency function each define the frequency of the excitation signal applied as a function of time through their respective segments; and the first amplitude function, the second amplitude function, the third amplitude function and the fourth amplitude function define the amplitude of the excitation signal applied as a function of time through their respective segments.

12. The method according to claim 10, wherein each of the first frequency function, the second frequency function, the third frequency function and the fourth frequency function each define the frequency of the excitation signal applied as a function of time through their respective segments; and the first amplitude function, the second amplitude function, the third amplitude function and the fourth amplitude function define the amplitude of the excitation signal applied as a function of time through their respective segments; and one or more of the first amplitude function, the second amplitude function, the third amplitude function and the fourth amplitude function are established in dependence upon an amplitude modulation applied to their respective segments and the lengths of their respective segments.

13. The method according to claim 10, wherein the excitation signal comprises at least one of:

a first sequential subset of a sequential series of segments beginning with an initial segment of the sequential series of segments; and a second sequential subset of the sequential series segments ending with another segment of the sequential series of segments;

the sequential series of segments comprises the initial segment, a subsequent segment following the initial segment, a further segment following the subsequent segment, and the another segment following the further segment;

the initial segment has an initial predetermined duration where the excitation signal sweeps from a first predetermined frequency to a second predetermined frequency over the length of the initial segment according to a first frequency function and from a first predetermined amplitude to a second predetermined amplitude over length of the initial segment according to a first amplitude function;

the subsequent segment has a subsequent predetermined duration where the excitation signal sweeps from a third predetermined frequency to a fourth predetermined frequency over the length of the subsequent segment according to a second frequency function and from a third predetermined amplitude to a fourth predetermined amplitude over the length of the subsequent segment according to a second amplitude function;

a further segment has a further predetermined duration where the excitation signal sweeps from a fifth predetermined frequency to a sixth predetermined frequency over the length of the further segment according to a third frequency function and from fifth predetermined amplitude to a sixth predetermined amplitude over the length of further segment according to a third amplitude function; and another segment has another predetermined duration where the excitation signal sweeps from a seventh predetermined frequency to an eighth predetermined frequency over the length of the another segment according to a fourth frequency function and from a seventh predetermined amplitude to an eighth predetermined amplitude over the length another segment according to a fourth amplitude function; and the first predetermined frequency, the second predetermined frequency, the third predetermined frequency, the fourth predetermined frequency, the fifth predetermined frequency, the sixth predetermined frequency, the seventh predetermined frequency and the eighth predetermined frequency are established in dependence upon whether the non-linear resonator is a hardening type resonator or a softening type resonator.

* * * * *